US006786879B1

(12) United States Patent
Bolam et al.

(10) Patent No.: US 6,786,879 B1
(45) **Date of Patent: *Sep. 7, 2004**

(54) GRADIENT SEQUENTIAL COMPRESSION SYSTEM FOR PREVENTING DEEP VEIN THROMBOSIS

(75) Inventors: Kenneth Michael Bolam, Charlotte, NC (US); James Arthur Borgen, Matthews, NC (US)

(73) Assignee: KCI Licensing, Inc., San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/103,694

(22) Filed: Jun. 24, 1998

Related U.S. Application Data

(63) Continuation-in-part of application No. 08/751,170, filed on Nov. 15, 1996, now Pat. No. 5,951,502, which is a continuation-in-part of application No. 08/233,429, filed on Apr. 5, 1994, now Pat. No. 5,454,700.

(51) Int. Cl.[7] .......................... A61H 15/00; F16L 35/00
(52) U.S. Cl. .......................................... 601/152; 285/93
(58) Field of Search ..................... 340/825.34; 235/375, 235/385; 285/93, 9.1; 601/148–162; 606/202; 600/16–20; 128/DIG. 20, 898

(56) References Cited

U.S. PATENT DOCUMENTS 2,361,242 A 10/1944 Rosett
2,533,504 A 12/1950 Poor
2,674,231 A 4/1954 Erickson (List continued on next page.)

FOREIGN PATENT DOCUMENTS

EP 0 392 669 10/1990
EP 0 552 515 A1 7/1993
EP 0 781 600 A2 7/1997

OTHER PUBLICATIONS

Jobst 510(k) Notice dated Sep. 25, 1989. Exhibits 1A–6G are attached as follows:
Exhibit 1A: photographs of front and rear view of System 2000; Exhibit 1B: photograph of System 2000 with wrap-around pneumatic sleeve and photograph of wrap–around pneumatic sleeve; Exhibit 1C: photograph of System 2000 with disposable wrap–around pneumatic sleeve and photograph of disposable wrap–around pneumatic sleeve.

(List continued on next page.)

*Primary Examiner*—Danton D. DeMille

(57) ABSTRACT

A gradient sequential compression system for preventing deep vein thrombosis includes a pressure-based system controller for controlling transfers of air from a source of pressurized air to inflatable chambers of a limb sleeve, so that a prophylactic modality is provided to the limb. The controller also includes a plurality of feeder valves pneumatically connected to each of the chambers and a microprocessor-based control unit for opening only one of the feeder valves at a time during an inflation cycle, so that each of the chambers can be independently inflated to predetermined pressure levels. The control unit also regulates the pressures in each of the chambers at the respective pressure levels by repeatedly independently measuring the pressures in the chambers and adjusting the pressure levels upward or downward, if necessary. The predetermined pressure levels can be default levels or selected by a user or health care professional for a particular application. In addition, the system controller can be programmed into a variety of modes for one or two-limb operation, for handling sleeves of varying length, or for providing different pressure cycles to the sleeves. The programming of the system controller can either be performed manually by the user through a display interface or by the use of a universal connecting device that senses the mode of operation associated with a sleeve connected thereto and automatically configures the system controller.

17 Claims, 12 Drawing Sheets

U.S. PATENT DOCUMENTS

| | | | | |
|---|---|---|---|---|
| 2,781,041 | A | | 2/1957 | Weinberg |
| 3,177,866 | A | | 4/1965 | Wesslund |
| 3,288,132 | A | | 11/1966 | Meredith |
| 3,391,692 | A | | 7/1968 | Spielberg |
| 3,442,270 | A | | 5/1969 | Steinman |
| 3,467,081 | A | | 9/1969 | Glass |
| 3,659,593 | A | | 5/1972 | Vail |
| 3,701,349 | A | | 10/1972 | Larson |
| 3,811,431 | A | | 5/1974 | Apstein |
| 3,824,992 | A | | 7/1974 | Nicholson et al. |
| 3,856,008 | A | | 12/1974 | Fowler et al. |
| 3,862,629 | A | | 1/1975 | Rotta |
| 3,885,554 | A | | 5/1975 | Rockwell, Jr. |
| 3,892,229 | A | | 7/1975 | Taylor et al. |
| 3,901,225 | A | | 8/1975 | Sconce |
| 3,920,006 | A | | 11/1975 | Lapidus |
| 3,924,613 | A | | 12/1975 | Beck |
| 3,933,150 | A | | 1/1976 | Kaplan et al. |
| 3,942,518 | A | | 3/1976 | Tenteris et al. |
| 4,013,069 | A | | 3/1977 | Hasty |
| 4,029,087 | A | | 6/1977 | Dye et al. |
| 4,030,488 | A | | 6/1977 | Hasty |
| 4,081,150 | A | | 3/1978 | Tyson |
| 4,091,804 | A | | 5/1978 | Hasty |
| 4,156,425 | A | | 5/1979 | Arkans |
| 4,198,961 | A | | 4/1980 | Arkans |
| 4,202,325 | A | | 5/1980 | Villari et al. |
| 4,207,875 | A | | 6/1980 | Arkans |
| 4,207,876 | A | | 6/1980 | Annis |
| 4,253,449 | A | | 3/1981 | Arkans et al. |
| 4,280,485 | A | | 7/1981 | Arkans |
| 4,295,343 | A | * | 10/1981 | Izumi .......................... 62/309 |
| 4,311,135 | A | | 1/1982 | Brueckner et al. |
| 4,320,746 | A | | 3/1982 | Arkans et al. |
| 4,321,929 | A | | 3/1982 | Lemelson et al. |
| 4,324,887 | A | * | 4/1982 | Kasper |
| 4,331,133 | A | | 5/1982 | Arkans |
| 4,335,726 | A | | 6/1982 | Kolstedt |
| 4,338,923 | A | | 7/1982 | Gelfer et al. |
| 4,338,944 | A | | 7/1982 | Arkans |
| 4,370,975 | A | | 2/1983 | Wright |
| 4,372,297 | A | | 2/1983 | Perlin |
| 4,375,217 | A | | 3/1983 | Arkans |
| 4,396,010 | A | | 8/1983 | Arkans |
| 4,402,312 | A | | 9/1983 | Villari et al. |
| 4,408,599 | A | | 10/1983 | Mummert |
| 4,413,620 | A | | 11/1983 | Tucker |
| 4,419,988 | A | | 12/1983 | Mummert |
| 4,453,538 | A | | 6/1984 | Whitney |
| 4,469,099 | A | | 9/1984 | McEwen |
| 4,481,937 | A | | 11/1984 | Arkans |
| 4,574,812 | A | | 3/1986 | Arkans |
| 4,577,626 | A | | 3/1986 | Marukawa et al. |
| 4,583,522 | A | | 4/1986 | Aronne |
| 4,597,384 | A | | 7/1986 | Whitney |
| 4,702,232 | A | | 10/1987 | Gardner et al. |
| 4,762,121 | A | | 8/1988 | Shienfeld |
| 4,793,328 | A | | 12/1988 | Kolstedt et al. |
| 4,827,912 | A | | 5/1989 | Carrington et al. |
| 4,841,956 | A | | 6/1989 | Gardner et al. |
| 4,857,196 | A | * | 8/1989 | Manabe et al. .......... 210/500.3 |
| 4,858,596 | A | | 8/1989 | Kolstedt et al. |
| 4,865,020 | A | | 9/1989 | Bullard |
| 4,922,893 | A | | 5/1990 | Wright et al. |
| 4,938,208 | A | | 7/1990 | Dye |
| 4,945,905 | A | | 8/1990 | Dye et al. |
| 4,971,044 | A | | 11/1990 | Dye |
| D315,406 | S | | 3/1991 | Dye |
| 5,007,411 | A | | 4/1991 | Dye |
| 5,022,387 | A | | 6/1991 | Hasty |
| 5,031,604 | A | | 7/1991 | Dye |
| 5,117,812 | A | | 6/1992 | McWhorter |
| 5,179,941 | A | | 1/1993 | Siemssen et al. |
| 5,186,163 | A | | 2/1993 | Dye |
| 5,263,473 | A | | 11/1993 | McWhorter |
| 5,307,791 | A | | 5/1994 | Senoue et al. |
| 5,330,720 | A | * | 7/1994 | Sorbo et al. |
| 5,343,736 | A | * | 9/1994 | Cady et al. |
| 5,383,894 | A | | 1/1995 | Dye |
| 5,443,440 | A | | 8/1995 | Tumey et al. |
| 5,478,119 | A | | 12/1995 | Dye |
| 5,494,801 | A | * | 2/1996 | Bogart et al. |
| 5,591,200 | A | | 1/1997 | Cone et al. |

OTHER PUBLICATIONS

Exhibit 2A: instructions for operation of Athrombic Pump® System 2000; Exhibit 2B: instructions for operation of Jobst Athrombic Pump System Wrap–Around Pneumatic Sleeve; Exhibit 2C: instructions for operation of Jobst Athrombic Pump System Disposable Wrap–Around Pneumatic Sleeve; Exhibit 2D: instructions for operation of Athrombic Pump® Model 116620, Form 586R6; Exhibit 2E: instructions for operation of Jobst® Anti–Em® Extremity Pump®, Model 116600, Form 582.

Exhibit 3A: front panel label (artwork)—condensed instructions for Jobst Athrombic Pump® System 2000; Exhibit 3B: data plate label; Exhibit 3C: front and back view of Wrap-Around Sleeve label; Exhibit 3D: front and back view of Disposable Wrap–Around Sleeve label; Exhibit 3E: description of Air Chamber label.

Exhibit 4A: Jobst brochure entitled, "Venous Thrombosis in the High–Risk Patient", Form 945 (1987); Exhibit 4B: Jobst article entitled: "Deep Vein Thrombosis," Form 294R3 (1981); Exhibit 4C: Jobst brochure entitled, "Anti–Em® Anti–Embolism Extremity Pump™," Form 639 (1974).

Exhibit 5A: Kendall advertisement; Exhibit 5B: Kendall advertisement for T.E.D./SEC Compression System; Exhibit 5C: Kendall Model 5320 operating instructions—T.E.D.® Sequential Compression Device; Exhibit 5D: Baxter advertisement for Pulsatile Anti–Embolism System; Exhibit 5E: Gaymar Industries, Inc. advertisement for Thrombogard; Exhibit 5F: Lyne–Nicholson, Inc. advertisement for Venodyne; Exhibit 5G: Camp International, Inc. advertisement for Hemaflo; Exhibit 5H: Comparative Chart—Compression Systems for Treatment of D.V.T.

Exhibit 6A: Salzman, et al., "Intraoperative external pneumatic calf compression to afford long–term prophylaxis against deep vein thrombosis in urological patients," Surgery, vol. 87, No. 3, 1980, pp. 239–242.

Exhibit 6B: "Prevention of Venous Thrombosis and Pulmonary Embolism," National Institutes of Health Consensus Development Conference Statement, vol. 6, No. 2.

Exhibit 6C: Hull et al., "Effectiveness of Intermittent Pulsatile Elastic Stockings for the Prevention of Calf and Thigh Vein Thrombosis in Patients Undergoing Elective Knee Surgery" (undated); Exhibit 6D: Coe et al., "Prevention of deep vein thrombosis in urological patients: A controlled, randomized trial of low–dose heparin and external pneumatic compression boots," Surgery, vol. 83, No. 2, 1978, pp. 230–234; Exhibit 6E: Klein et al., "Prevention of Thromboembolism in Urological Patients" (undated); Exhibit 6F: Whalen et al., "Deep Vein Thrombosis—Prophylaxis" (undated); Exhibit 6G: Salzman et al., "Effect of Optimization of Hemodynamics on Fibrinolytic Activity and Antithrombotic Efficacy of External Pneumatic Calf Compression," Ann. Surg., vol. 206, No. 5, 1987, pp. 636–641.

Letter to Food and Drug Administration dated Dec. 20, 1989, supplementing 510(k).
Letter to Food and Drug Administration dated Nov. 9, 1989, supplementing 510(k). Exhibits 1–5D are attached as follows:
Exhibit 1: Jobst Institute, Inc. Overview of Deep Vein Thrombosis, Pulmonary Embolism and Discussion of Prophylactic Methods.
Exhibit 2: Jobst Nov. 8, 1989 Memorandum to File from Kotwick Regarding: Evolution of the Design of the Jobst Athrombic Pump.
Exhibit 3A: Jobst Institute, Inc., Engineering Study #89102, Introduction & Methods, Title: Electromagnetic Interference Considerations of the Jobst Athrombic Pump System 2000.
Exhibit 3B: Jobst Institute, Inc., Engineering Study #89102, Results & Discussion.
Exhibit 4A: Jobst Institute, Inc., Engineering Study #89101, Introduction & Methods, Title: Performance Comparison of the Jobst Athrombic Pumps. Exhibit 4B: Jobst Institute, Inc., Engineering Study #89101, Results & Discussion.
Exhibit 5A: Graor et al., "The Comparative Evaluation of Deep Vein Thrombosis Prophylaxis in Total Joint Replacement Patents: An Interim Report," presented at the 1989 meeting of the American Academy of Orthopaedic Surgeons. Exhibit 5B: Salzman et al., "Prevention of Venous Thromboembolism in Unstable Angina Pectoris," The New England Journal of Medicine, vol. 306, No. 16, 1982. Exhibit 5C: Moser, "Pulmonary thromboembolism: Your challenge is prevention," The Journal of Respiratory Diseases, vol. 10, No. 10, 1989, pp. 83–85, 88, 91–93. Exhibit 5D: Green et al., "Deep Vein Thrombosis in Spinal Cord Injury: Effect of Prophylaxis with Calf Compression, Aspirin, and Dipyridamole," Paraplegia, vol. 20, 1982, pp. 227–234.
Kendall Healthcare Products Company brochure entitled "A Clinically Proven Home Regimen to Treat Venous Insufficiency" (1989).
Kendall Healthcare Products Company Instruction Manual entitled "SCD™ Therapeutic System," pp. 1–8 (1989).
Kendall Healthcare Products Company Sep. 1, 1993 letter and brochure entitled "T.E.D.®/SCD™ Compression System.".
Kendall Healthcare Products Company brochure entitled "Making Prevention Operative," (1991).
Kendall Healthcare Products Company information order form entitled "A Clinically Proven Home Regimen to Treat Venous Insufficiency," (1989).
Kendall Healthcare Products Company brochure entitled "The Home Rx™ Vascular Compression System for Healing Venous Ulcers," (1991).
Kendall T.E.D.® Sequential Compression Device Model 5320 Operating Instructions, pp. 1–17, 1985.
Olson et al., "Experimental Studies of External Pneumatic Compression Methods on a Model Human Leg," 32nd ACEMB, Denver Hilton Hotel, Denver, CO, Oct. 6–10, 1979.
Caprini, "Role of Compression Modalities in a Prophylactic Program for Deep Vein Thrombosis," Seminars in Thrombosis and Hemostasis—Supplement, vol. 14, 1988, pp. 77–87.
Hull, et al., "Effectiveness of Intermittent Pneumatic Leg Compression for Preventing Deep Vein Thrombosis After Total Hip Replacement," JAMA, vol. 263, No. 17, May 2, 1990, pp. 2313–2317.
Bucci, et al., "Mechanical Prophylaxis of Venous Thrombosis in Patients Undergoing Craniotomy: A Randomized Trial," Surg. Neurol. vol. 32, 1989, pp. 285–288.
Jobst brochure entitled, "Athrombic Pump® System 2500—Gradient Sequential Venous Compression System.".
Database WPI; Week 7546; Derwent Publications Ltd.,; London, GB; AN 7576460 XP002099115 & JP 50 076294 A (Biofermin Pharma Co); Jun. 21, 1975; *abstract*.

* cited by examiner

GRADIENT SEQUENTIAL COMPRESSION SYSTEM FOR PREVENTING DEEP VEIN THROMBOSIS

CROSS-REFERENCE TO RELATED APPLICATION

This application is a continuation-in-part to application Ser. No. 08/751,170, filed Nov. 15, 1996, now U.S. Pat. No. 5,951,502 which is a continuation-in-part to application Ser. No. 08/233,429, filed Apr. 28, 1994, now U.S. Pat. No. 5,454,700, which is hereby incorporated herein by reference.

FIELD OF THE INVENTION

The present invention relates to therapeutic medical devices and methods, and more particularly to devices and methods for improving venous blood flow in a patient.

BACKGROUND OF THE INVENTION

Deep vein thrombosis (DVT) and pulmonary embolism (PE) constitute major health problems in the United States. It has been estimated that 300,000 to 600,000 hospitalizations a year are attributable to DVT and PE conditions. Venous thromboembolism is also a significant risk in surgical patient populations where preoperative, operative and postoperative immobilization with concomitant loss of venous pump function causes blood stasis.

The use of prophylactic antithrombotic drugs for preventing DVT are known to the art. However, the efficacy of prophylactic administration of anticoagulants and antiplatelet agents has been disputed, and is certainly not absolute. An alternative approach, attractive because of its freedom from hemorrhagic side effects, is the use of physical techniques such as elastic stockings, passive leg exercise, electrical calf stimulation and external pneumatic compression of the legs. Pneumatic compression has been the most studied and appears to be an effective therapeutic technique. For example, the results of a comparison trial between sequential compression and uniform compression are disclosed in article by E. W. Salzman, et al., entitled *Effect of Optimization of Hemodynamics on Fibrinolytic Activity and Antithrombotic Efficacy of External Pneumatic Calf Compression,* Annals of Surgery, Vol. 206, No. 5, November (1987), pp. 636–641. Salzman et al. also discloses the lack of commercially available systems for applying external pneumatic compression in an optimized manner, based on blood flow velocity and volumetric flow rate, etc. Antithrombotic modalities based on sequential pneumatic compression are also disclosed in articles by J. A. Caprini, et al., entitled *Role of Compression Modalities in a Prophylactic Program for Deep Vein Thrombosis,* Seminars in Thrombosis and Hemostasis, Vol. 14, Supp., Thieme Medical Publishers, Inc., pp. 77–87, (1988); and Hull, et al., entitled *Effectiveness of Intermittent Pneumatic Leg Compression for Preventing Deep Vein Thrombosis After Total Hip Replacement,* Journal of the American Medical Association, Vol 263, No. 17, May, 2, 1990, pp. 2313–2317. Devices for performing sequential compression have also been patented. For example, U.S. Pat. No. 4,396,010 to Arkans, discloses a time-based sequential compression device for simultaneously inflating multiple limb sleeves. Time-based sequential compression devices are also publicly available from The Kendall Company, of Massachusetts. For example, FIG. 1 illustrates an experimentally derived graph of an inflation cycle for a Model 5325 sequential compression device, manufactured by The Kendall Company. It is believed, however, that none of these sequential compression devices and methods provide for optimum blood flow velocity and volumetric flow rate in recumbent patients.

Thus, notwithstanding these attempts to develop compression devices for preventing deep vein thrombosis and pulmonary embolism, there continues to be a need for a gradient sequential compression system which provides a high blood flow velocity and a highly therapeutic prophylactic modality to limbs of a recumbent user.

SUMMARY OF THE INVENTION

It is therefore an object of the present invention to provide a system and method for reducing the occurrence of deep vein thrombosis (DVT) and pulmonary embolism in recumbent users.

It is also an object of the present invention to provide a system and method for achieving a high venous blood flow rate in a limb of a user.

It is another object of the present invention to provide a system and method of sequentially establishing a gradient of compressive forces, which is pressure-based.

It is a further object of the present invention to provide a system and method of regulating a gradient of compressive forces, using real-time feedback.

It is still a further object of the present invention to provide a system and method of providing a prophylactic modality to limbs of a user in an alternating sequence.

It is another object of the present invention to provide a system and method for determining the selected mode of operation used for achieving a high venous blood flow rate in a body portion of a user based on the type of compression sleeve or the particular body portion to be treated.

It is still a further object of the present invention to provide a universal connecting device and method that identifies a mode of operation associated with a connector mated thereto and provides a signal indicative of the mode of operation to the system such that the system may be automatically configured to the selected mode of operation.

These and other objects, features and advantages of the present invention are provided by a compression system and method which provides cyclical squeezing and relaxing action to one or more limbs of a user. This occurs by sequentially establishing a decreasing gradient of compressive forces along the limbs in a proximal direction. In particular, the compression system includes one or more sleeves (e.g., calf, thigh, calf and thigh, arm, forearm, torso, etc.) which can be wrapped around and releasably secured to a limb(s) of a user. The sleeves have one or more inflatable chambers therein for retaining pressurized air upon inflation and for applying a compressive force to a limb. The compression system also includes a system controller for controlling transfers of pressurized air from an external or internal source to the inflatable chambers of the sleeves during respective inflation cycles, and for venting the pressurized air during respective deflation cycles. Transfers of air from the system controller to the sleeves are preferably provided by pneumatic connecting means which can include first and second conduit means. First and second conduit means preferably include a plurality of separate conduits or conduit ribbon.

According to one embodiment of the present invention, the system controller includes control means and first and second pluralities of feeder valves, responsive to control means, for enabling and disabling transfers of air from the source to respective ones of the inflatable chambers. Control means is provided for controlling the sequence by which the feeder valves are directionally opened and closed so that during an inflation cycle a gradient of compressive forces can be sequentially established and maintained along a limb of a user for a predetermined time interval. In particular, according to a first embodiment, control means is provided for opening only one of the feeder valves to the source of pressurized air at a time, so that each of the inflatable chambers is independently inflated and regulated (e.g., measured and adjusted). Control means preferably includes a pressure transducer and means coupled thereto for sampling the pressures in each of the inflatable chambers and adjusting the pressures based on the samples so that the chambers are maintained at predetermined pressures, even if the limb sleeves are relatively loosely or tightly wrapped or the position of the limb is adjusted during treatment.

According to an aspect of the first embodiment of the present invention, the system controller includes first and second intermediate valves, connected between the source and the respective first and second pluralities of feeder valves. The intermediate valves, which are responsive to control means as well, enable transfer of air from the source to the first and second pluralities of feeder valves during respective first and second inflation cycles and vent air from the first and second pluralities of feeder valves during respective deflation cycles. In particular, the feeder valves and intermediate valves are directionally opened and closed to facilitate inflation, measurement and adjustment of the pressures in the limb sleeves.

The system controller also preferably includes means for sensing whether pneumatic connecting means is attached thereto. Sensing means may include an infrared, Hall effect or reflective sensor(s), for example. Control means also includes means, responsive to the sensing means, for automatically adjusting from a default two-limb mode of operation to a one-limb mode by preventing the occurrence of either the first or second inflation cycles if the respective first or second conduit means is disconnected from the system controller. The first and second inflation cycles are preferably 180° out of phase so that only one limb sleeve is being inflated at a time.

According to another aspect of the present invention, the sensor also determines the selected mode of operation to be used by the controller. As stated previously, the current invention utilizes different compression sleeves. These compression sleeves contain different numbers of inflation chambers and are formed differently to conform to and adequately compress selected portions of the body (i.e., calf, thigh, calf and thigh, arm, forearm, torso, ect.). Further, the system utilizes different pressure cycles for providing treatment to different body portions. The controller of the present invention determines the proper mode of operation for the system by using a sensor. This sensor senses an indication from an indicator connected to the compression sleeve being used by the system. This indicator designates the mode of operation associated with the sleeve. In this embodiment, the sensor provides a signal to the controller that identifies the selected mode of operation indicated by the sleeve. The controller configures the system in accordance with this signal to operate in the selected mode of operation. This, in turn, allows for the automatic configuration of the controller for a selected treatment without the need for user input.

The system controller also includes means for detecting low and high pressure fault conditions which can be caused by disconnected or occluded conduits, and sleeves that are wrapped too loosely or too tightly about a limb.

According to yet another aspect of the invention, compressive forces are applied to a limb of a user by sequentially compressing a distal portion and then a relatively proximal portion of the limb to provide respective first and second radially inwardly directed compressive forces thereto. The first compressive force is maintained above the second compressive force so that a decreasing pressure gradient is established in a proximal direction along the limb for a preselected time interval. The force is preferably maintained by measuring the compressive forces and adjusting (i.e., increasing or decreasing) the compressive forces to maintain predetermined forces.

More particularly, the invention includes a method of applying compressive forces to a limb of a user using a multi-chambered inflatable limb sleeve surrounding the limb. The method includes the steps of pressurizing a first chamber of the limb sleeve to a first predetermined chamber pressure and then pressurizing a second chamber, disposed proximally relative to the first chamber, to a second preselected chamber pressure, after the first chamber reaches a first threshold pressure. The first threshold pressure may be less than or equal to the first predetermined pressure.

Preferably, the second chamber pressurizing step occurs after a pressure in the first chamber has been established at the first predetermined pressure for at least a first time interval. A step is also performed to regulate the pressures in the first and second chambers at their respective predetermined pressures so that a constant pressure gradient is established therebetween. The regulating step may include the steps of measuring a pressure in the first chamber while preventing depressurization of the second chamber and vice versa. Additionally, the regulating step may include the steps of measuring a pressure in the first chamber after it has been inflated to the first threshold pressure and then re-measuring a pressure in the first chamber, after the second chamber has been inflated to the second threshold pressure.

The pressures in the chambers may also be adjusted by performing periodic reinflating steps (and also deflating steps). Similar steps may also be performed to inflate third and fourth, etc. chambers of the limb sleeve, in sequence, so that a monotonically decreasing pressure gradient is established and maintained in a proximal direction between the chambers of a sleeve(s).

A periodic adjusting step may also be performed to adjust the pressures in the chambers during an inflation cycle, by sampling (once or repeatedly) a pressure in a respective chamber to obtain a pressure sample and then adjusting the pressure by inflating or deflating the respective chamber, based on the value of the sample. Pressure samples from a respective chamber during an inflation cycle can also be averaged to determine whether a critical overpressure condition occurred during a prior inflation cycle and/or occurred multiple consecutive times during prior inflation cycles. If a critical overpressure condition has occurred, subsequent inflation cycles can be disabled to maintain the respective sleeve(s) in a continuously deflated state until the system is reset or the critical condition is corrected. Thus, instantaneous pressure spikes can be compensated to prevent the occurrence of shutdown when a single or relatively few aberrant pressure samples have been measured.

According to a second embodiment of the present invention, each of the feeder valves described with respect to the first embodiment are replaced by a pair of filling and monitoring valves. The filling valves are preferably normally-closed valves and the monitoring valves are preferably normally-open valves. Here, the filling valves have an open state for enabling one-at-a-time transfer of pressured air from a source to the inflatable chambers of the first and second limb sleeves, in response to application of an energizing signal (e.g., logic 1), and a normally-closed blocking state which disconnects a respective chamber from the air source. In contrast, the monitoring valves have a normally-open state for enabling transfer of pressurized air from a respective inflatable chamber to an output thereof. These outputs are preferably pneumatically coupled through a corresponding three-way normally-open intermediate valve to a vent "V" or a pressure transducer in response to appropriate control signals. The monitoring valves also have a closed state (which can be achieved by application of an energizing signal (e.g., logic 1)) to prevent the escape of pressured air from a respective chamber when other chambers are being inflated or when the pressures in other chambers are being independently measured.

Control means, which is operatively connected to the filling, monitoring and intermediate valves, is provided for inflating a first inflatable chamber of the first limb sleeve by disposing the corresponding filling valve in an open state and the other filling valves in their respective normally-closed states. During inflation of the first inflatable chamber, the corresponding first monitoring valve is also disposed in a normally-open state so that the pressure in the first inflatable chamber can be measured in real time as it is being inflated and thereafter when the first inflatable chamber is fully inflated and the corresponding filling valve has been closed. Thus, in contrast to the first embodiment, the pressure in a chamber can be continuously measured as the chamber is being inflated to its respective predetermined pressure. This provides real-time feedback of the chamber pressure. Preferably, this real-time feedback is used by the control means to adjust the inflation time of the respective chamber during the current or subsequent inflation cycle(s). The amount of time needed to measure the pressure in a chamber after the respective filling valve closes can also be reduced because the pneumatic connecting lines between the respective monitoring valve and the pressure transducer will already be at least partially pressurized at the respective chamber pressure when the measurement operation commences.

DESCRIPTION OF A PREFERRED EMBODIMENT

The present invention will now be described more fully hereinafter with reference to the accompanying drawings, in which preferred embodiments of a compression system and method are shown and described. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
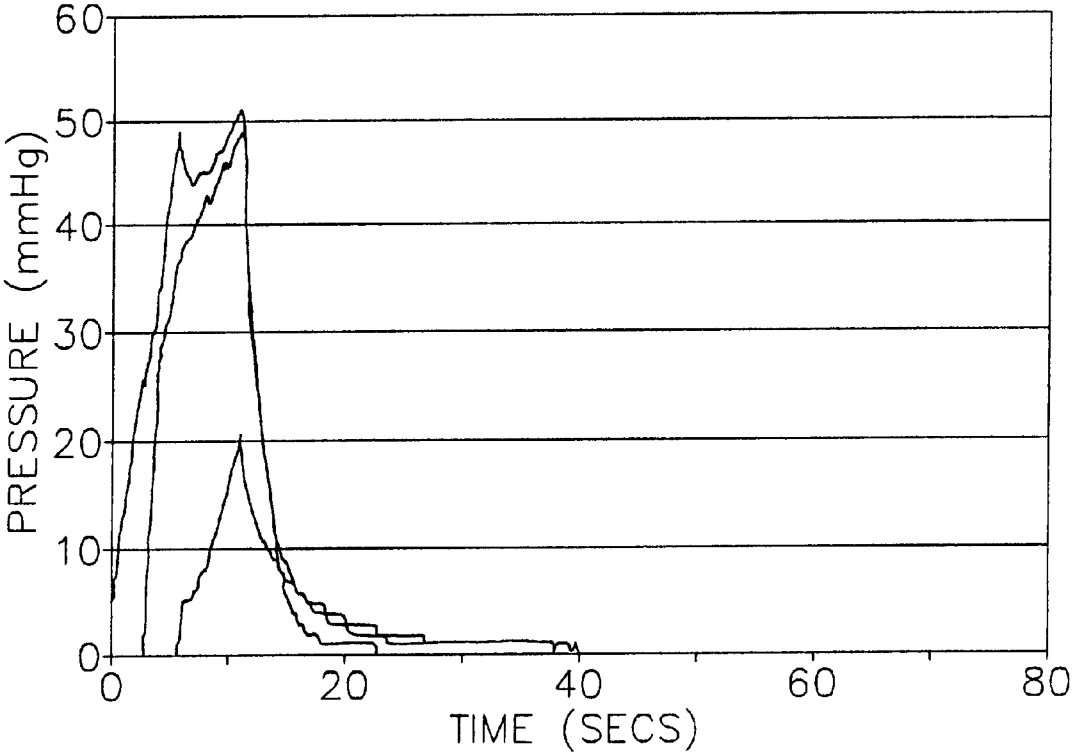
FIG. 1. (PRIOR ART)
FIG. 1 is a graph illustrating an inflation cycle of a three chamber compression system, according to the prior art.
Figure 2:
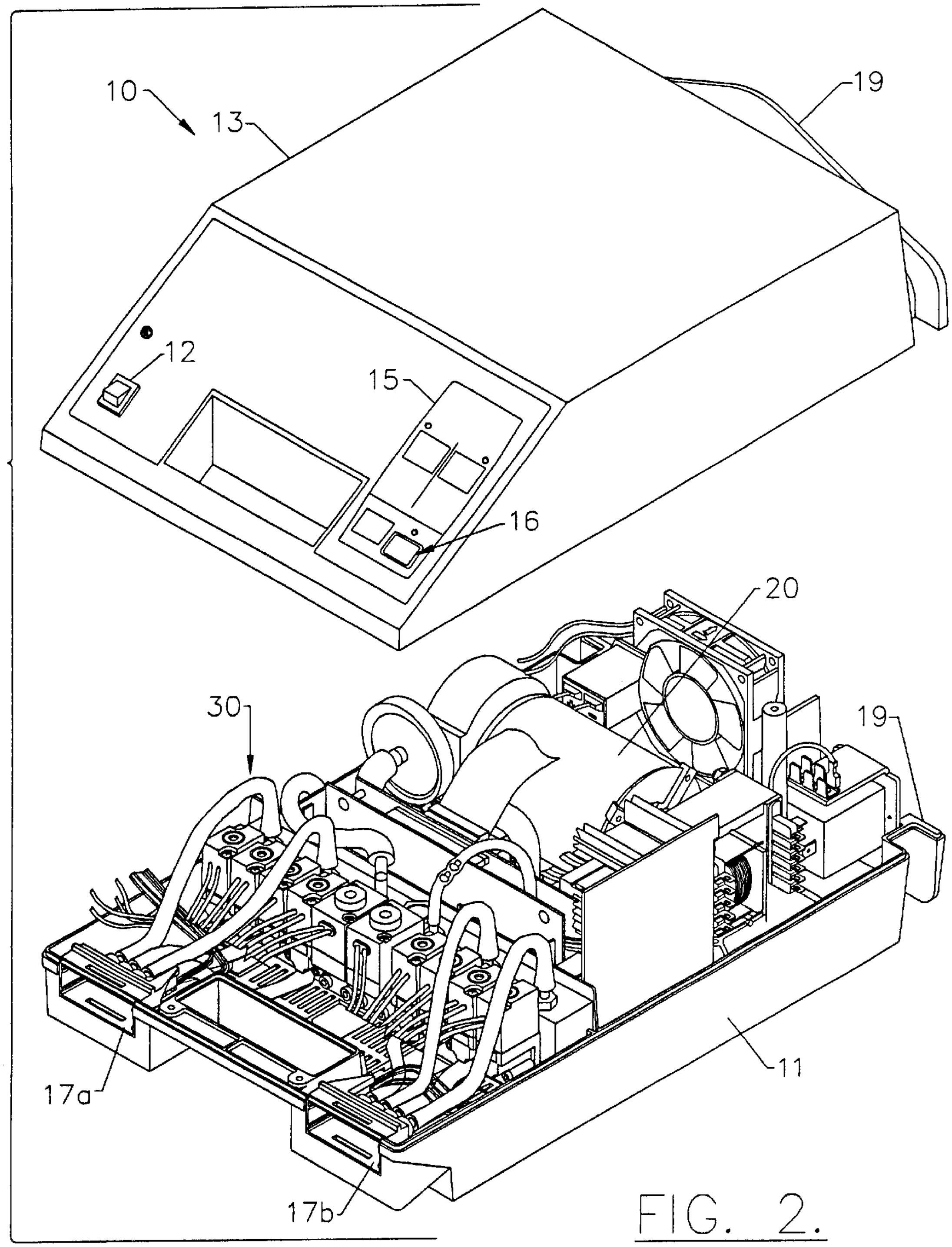
FIG. 2 is a perspective view of a system controller according to an embodiment of the present invention.

Referring now to FIG. 2, a first embodiment of a system controller 10 according to the present invention will be described. The system controller 10 includes a housing formed by top and bottom housing portions 13 and 11, respectively. The top housing portion 13 may include an on/off switch 12 and a sloped display 15, such as an LED display or a more preferable liquid crystal display (LCD), for visually communicating chamber inflation information (e.g., pressure levels, chamber status), the mode of operation (e.g., one- or two-limb mode; and 2, 3 or 4-chamber mode, calf, thigh, calf and thigh, foot, arm, forearm, torso, ect.) and alarm, alert and fault conditions. The display may also provide means, responsive to actuation by a user or health care professional, for preselecting the desired pressure levels to be achieved during a sleeve inflation cycle. Based on experiment, it was determined by the inventors herein that pressures ranging from 65–15 mmHg are most preferred.

The system controller 10 may also include an internal source of pressurized air 20 such as a compressor, however, an external pneumatic fitting or similar device (not shown) may be provided adjacent the controller housing for connecting the controller 10 to an external source of pressurized air. A bracket 19 is also provided for securing an electrical cord (not shown) during periods of nonuse.

Figure 4:
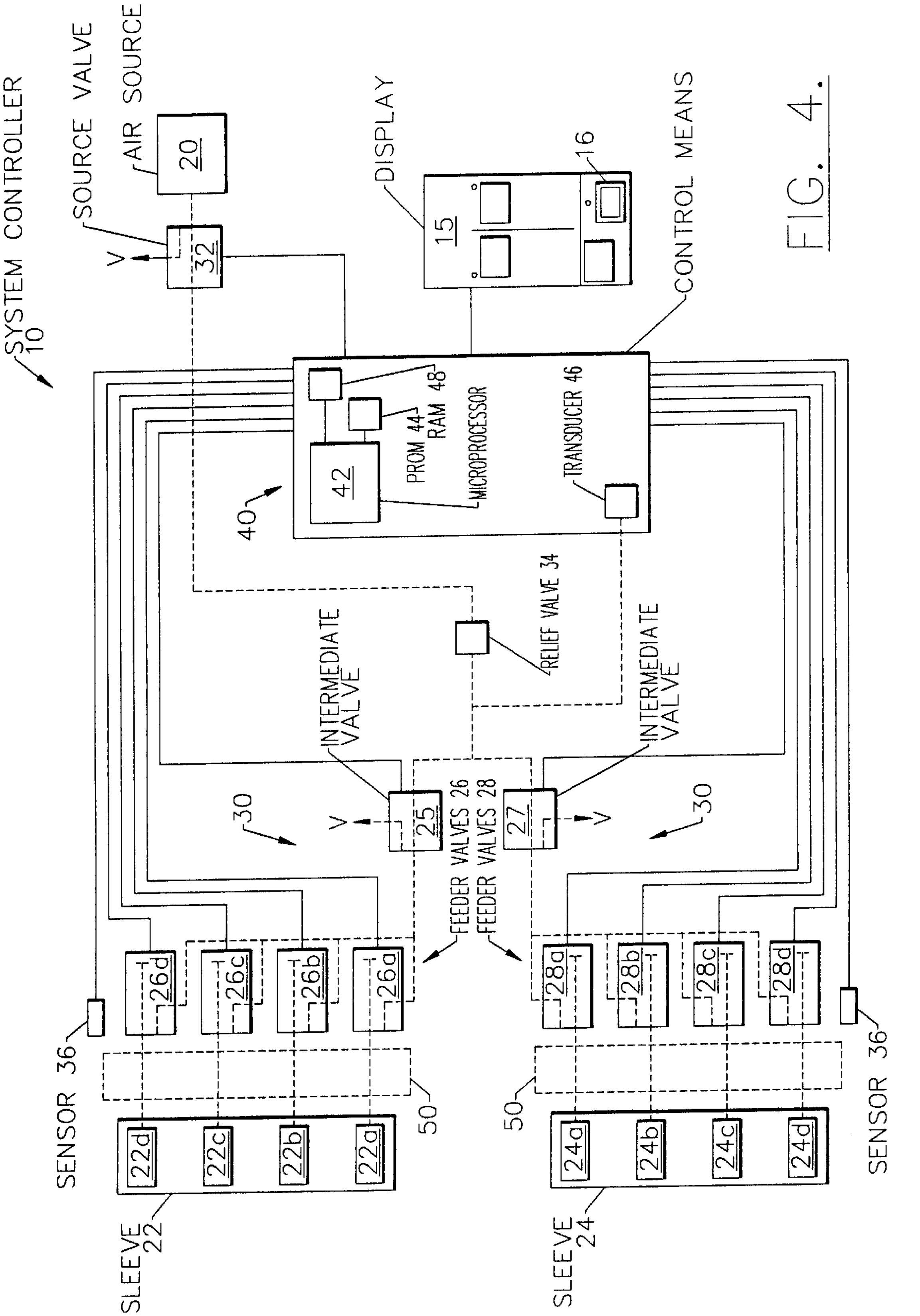
FIG. 4 is a schematic diagram illustrating a compression system according to a first embodiment of the present invention.
Figures 6A, 6B:
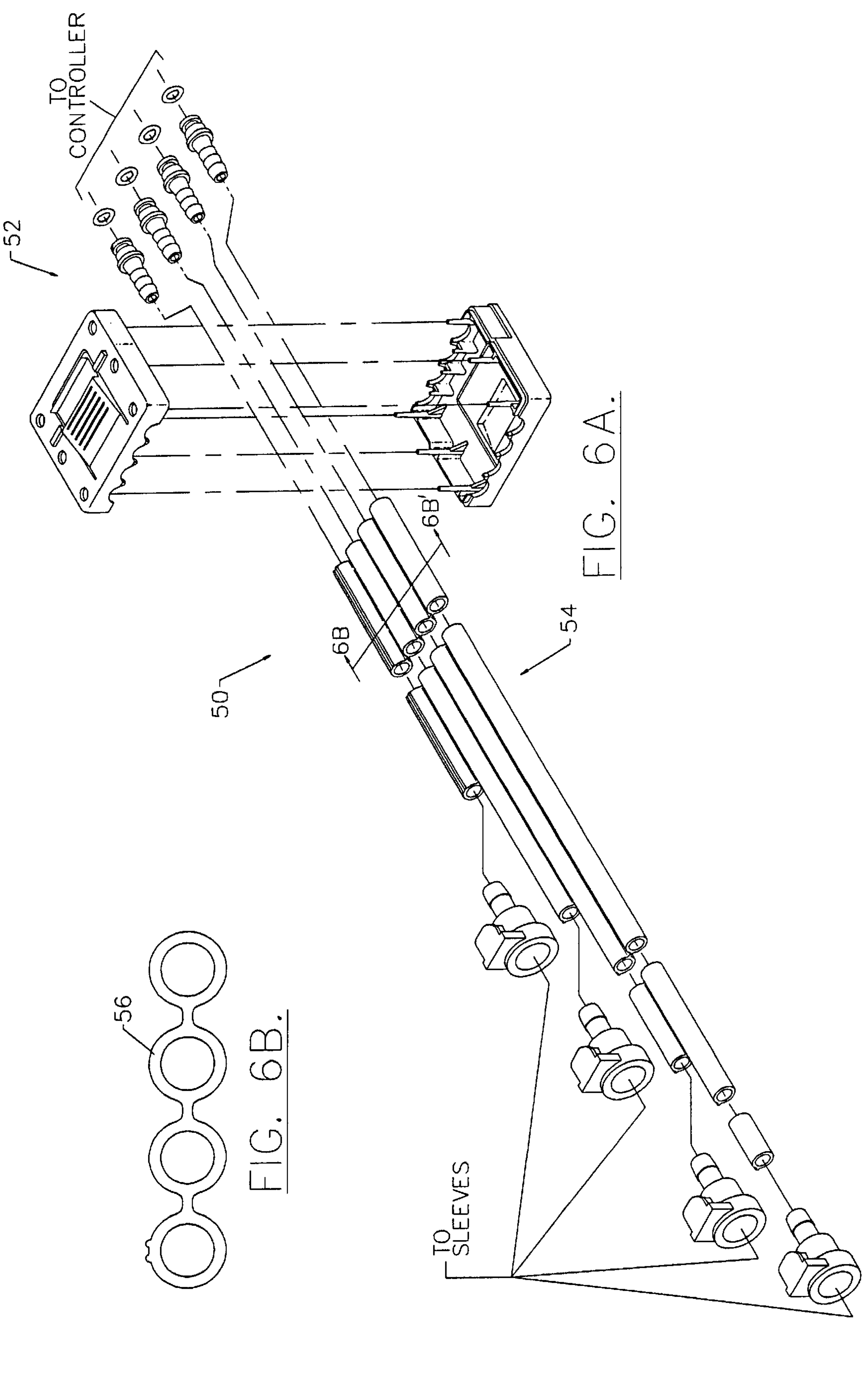
FIG. 6A is a perspective view of a preferred pneumatic connecting means utilized by the present invention.
FIG. 6B is a cross-sectional view of the pneumatic connecting means according to FIG. 6A, taken along the lines 6B–6B'.

The system controller 10 also preferably includes a valve manifold 30 having a plurality of valves which facilitate inflation of limb sleeves 22 and 24. As illustrated by FIG. 4, the limb sleeves are preferably four-chamber sleeves. Alternatively, a plurality of single-chamber sleeves may be provided as an equivalent substitute for a multi-chamber sleeve. The valves in the manifold 30 are also directionally coupled and controlled to facilitate measurement and adjustment of pressures in the limb sleeves 22, 24, as explained more fully hereinbelow with respect to FIGS. 4 and 7. Preferred means 50 for pneumatically connecting the system controller 10 to the limb sleeves is also illustrated by FIGS. 6A–6B. Pneumatic connecting means 50 preferably comprises first and second conduit means 54, such as a plurality of flexible conduits or conduit ribbon 56, as illustrated in FIG. 6B. These and other preferred features of the sleeves 22, 24 and connecting means 50 are disclosed in commonly assigned U.S. Pat. Des. No. 376,013, to Sandman et al. entitled *Compression Sleeve for Deep Vein Thrombosis,* and U.S. Pat. No. 5,588,954, to Ribando et al. entitled *Connector for a Gradient Sequential Compression System,* the disclosures of which are hereby incorporated herein by reference.

Figure 3A:
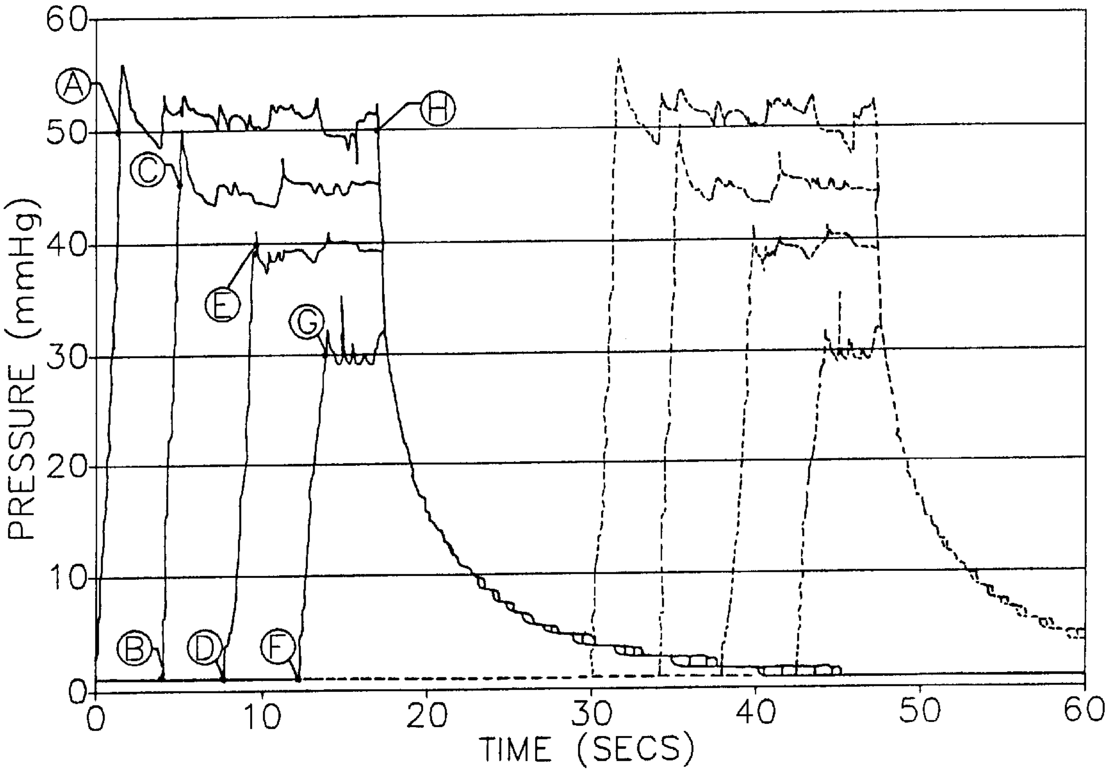
FIG. 3A is a graph illustrating first and second inflation cycles, according to the present invention.
Figure 3B:
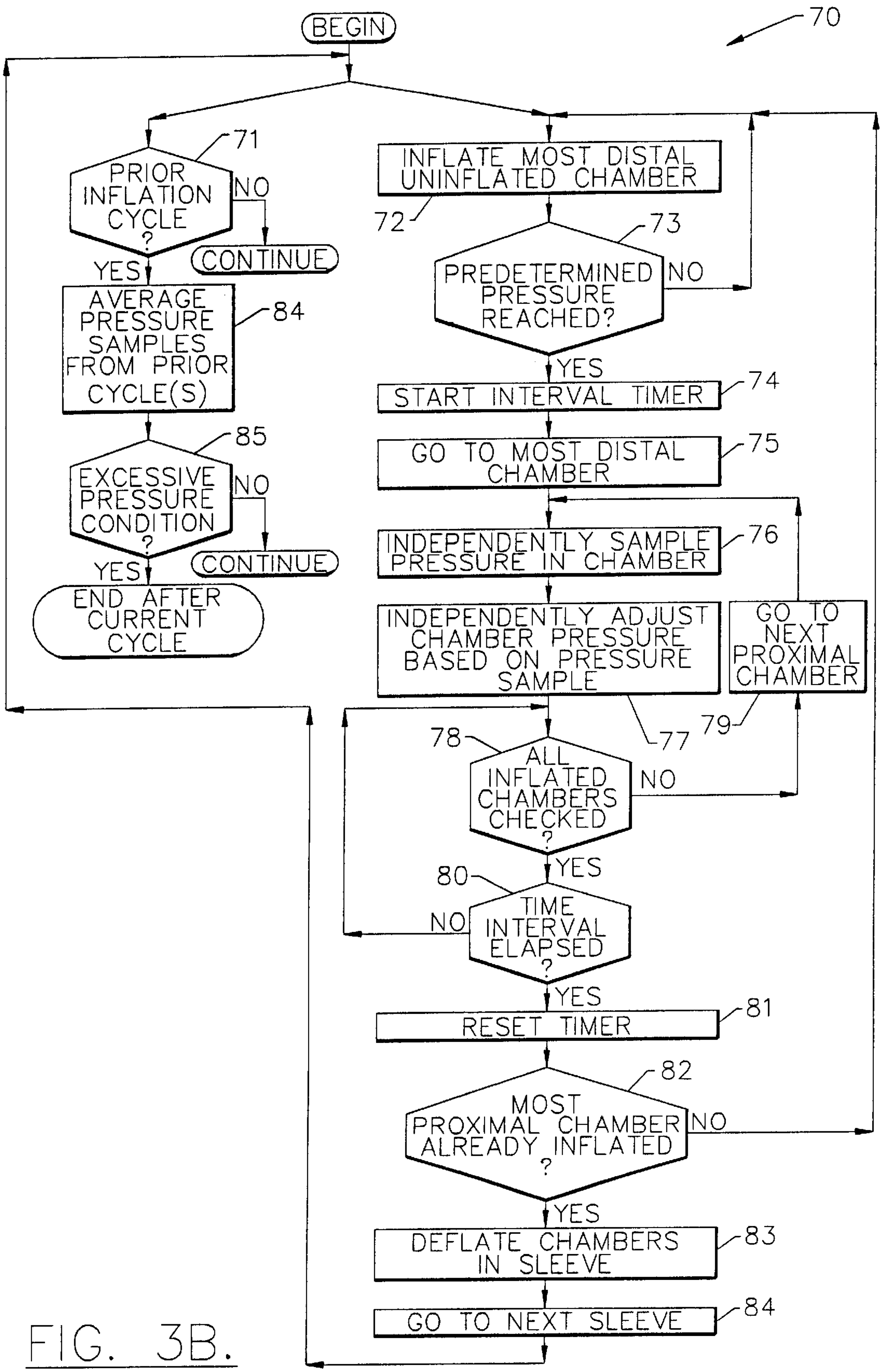
FIG. 3B is a flow chart illustrating the operations performed by a system controller according to an embodiment of the present invention, during the first and second inflation cycles illustrated by FIG. 3A.

Referring now to FIGS. 3A–3B, a preferred method of applying compressive forces to a limb of a user using a multi-chambered inflatable limb sleeve includes inflating (i.e., pressurizing) a first chamber of the limb sleeve to a first predetermined chamber pressure, shown as 50 mmHg, during a first inflation cycle (shown by solid lines). As will be understood by those skilled in the art, pressurization of a chamber causes a compression of the limb and provides a radially inwardly directed compressive force about the circumference of the limb. The predetermined chamber pressures may be user selected at the display, however respective default pressures are preferably fixed by the controller 10. Thereafter, at time B, a second chamber of the sleeve, which is disposed proximally relative to the first chamber, is pressurized to a second predetermined pressure level, shown as 45 mmHg, by time C. Time B preferably occurs after the pressure in the first chamber reaches a threshold pressure, and more preferably after the first chamber pressure has been established at a respective predetermined pressure for a predetermined time interval. The threshold pressure may be less than or equal the first predetermined pressure of 50 mmHg.

As further illustrated, the time interval between times B and A is shown as 2.5 seconds, which is a default time interval. However, another predetermined time interval in the preferred range of 1–4 seconds may also be selected by a health care professional to achieve a preferred venous blood flow rate, based on the particular therapeutic application and medical needs of the recumbent user. According to an aspect of the present invention, means may be provided at the display 15 for allowing preselection of the desired time interval.

In the time interval between times B and A, a measurement (i.e., "sample") of the pressure in the first chamber is taken at least once. Based on this sample, the pressure in the first chamber is adjusted to the 50 mmHg level, if necessary. Adjustment of the pressure in a chamber can occur by either inflating the chamber if the pressure sample is too low or deflating the chamber if the pressure sample is too high. As illustrated, the pressure in the first chamber is adjusted from below 50 mmHg to above 50 mmHg at least once prior to time B.

At time D, which preferably occurs 2.5 seconds after time C, the third chamber is inflated to a third predetermined pressure level, shown as 40 mmHg. This occurs at time E. In addition, during the time interval between times D and C, samples of the pressures in the first and second chambers are taken at least once and the pressures are independently adjusted to the 50 and 45 mmHg levels, if necessary. As explained more fully hereinbelow with respect to FIG. 4, independent measurement of a pressure in a chamber occurs without depressurizing the other chambers. Furthermore, independent adjustment is achieved by pressurizing (or depressurizing) one chamber, while preventing pressurization (or depressurization) of the other chambers.

At time F, which preferably occurs 2.5 seconds after time E, the fourth chamber is inflated to a fourth predetermined pressure level, shown as 30 mmHg. This occurs at time G. The 50, 45, 40 and 30 mmHg levels establish a monotonically decreasing pressure gradient in a proximal direction along the limb of a user. It was determined by the inventors herein that a dual gradient of 5 mmHg between the first and second chambers and 10 mmHg between the third and fourth chambers is most preferred, however constant pressure levels in each chamber (i.e., no gradient) may also be possible if they are sequentially established.

In addition, during the time interval between times F and E, samples of the pressures in the first, second and third chambers are taken at least once and the pressures are independently adjusted to the 50, 45, and 40 mmHg levels, if necessary. And during the time interval between times G and H, samples of the pressures in each of the chambers are taken again and independent adjustments are made, if necessary. At time H, the chambers are simultaneously deflated. Time H preferably occurs 2.5 seconds after the pressure in the fourth chamber reaches a respective threshold pressure, and more preferably after the fourth chamber pressure has been established at 30 mmHg. Accordingly, times B, D, F and H preferably occur 2.5 seconds after times A, C, E and G, respectively. Alternatively, these time intervals may be preselected to be of varying length.

As illustrated, inflation of a first limb sleeve occurs 180° (e.g., 30 seconds) out of phase with respect to inflation of a second limb sleeve. In other words, only one sleeve is preferably inflated at a time (although both could be simultaneously inflated). Based on default settings which may be adjusted at the display 15, the inflation cycle for the second sleeve (shown by dotted lines) begins 30 seconds after initiation of the first inflation cycle. Both the first and second inflation cycles preferably have default periods of 60 seconds, as illustrated. According to an aspect of the present invention, 30 seconds also sets the maximum inflation time. Thus, a sleeve will automatically be deflated if time H does not occur before 30 seconds have elapsed from the initiation of inflation. Alternatively, the second inflation cycle could begin automatically at time H (i.e., after all chambers in the first sleeve have been inflated for the requisite 2.5 seconds), rather than at the 30 second mark. In this latter case, the inflation cycle period for each sleeve would typically vary from cycle to cycle, as would be understood by those skilled in the art.

Referring now to FIG. 3B, operations 70 performed by the system controller 10 during the first and second inflation cycles are summarized. In particular, the operations begin with the first sleeve and then an operation is performed to inflate the most distal chamber in the sleeve that is uninflated, Block 72. Thereafter, an operation is performed to determine whether a respective predetermined pressure in the chamber has been reached, Block 73. If not, pressurization is continued. However, if the respective predetermined pressure for the chamber has been reached, an interval timer is started, Block 74. Thereafter, the most distal chamber of the sleeve is preferably selected, Block 75, and then measured to obtain a pressure sample, while preventing depressurization of the other chambers, Block 76. Based on the respective pressure sample, an operation is then performed to adjust (+/−) the chamber pressure, Block 77. This is repeated for each of the next proximal chambers which have already been inflated, Blocks 78–79. Alternatively, this order of sampling the pressures (i.e., distal → proximal) may be reversed. Once the time interval (e.g. 2.5 seconds) has elapsed, Block 80, the timer is reset (Block 81) and then a check is performed to see if all chambers have been inflated, Block 82. If not, the next uninflated chamber is selected, Block 72, and the operations are repeated. Alternatively, the time interval check performed at Block 80 may be performed after each chamber has been checked instead of after all chambers have been checked. If the most proximal chamber has been inflated for the requisite elapsed time interval, then all chambers are deflated, Block 83. This begins the deflation cycle for the respective sleeve. The next sleeve is then selected, Block 84, and operations begin at Block 72, so that inflation of the next sleeve preferably occurs 180° out of phase with the previous sleeve (i.e., 30 seconds after commencement of inflation for the previous sleeve).

According to another aspect of the present invention, operations can also be performed in parallel with those operations illustrated by Block 72–83. In particular, a check is performed to determine if a prior inflation cycle has occurred, Block 71. If not, the normal operations (Blocks 72–82) are continued. If a prior inflation cycle has occurred, the pressure samples obtained from the prior cycle (or prior cycles) are averaged for each chamber, Block 84. Based on these averages, a check is performed to determined whether an excessive pressure condition has occurred, Block 85. If it has, subsequent inflation cycles are terminated until the system is reset, otherwise normal operations are continued. The system can be reset by accessing the display 15. According to this aspect of the present invention, instantaneous spikes in the pressures of one or more chambers can be compensated to prevent the occurrence of shutdown when a single or relatively few aberrant pressure samples have been measured during an inflation cycle or during consecutive inflation cycles (e.g., 5). As described below with respect to FIG. 4, these operations are preferably performed by a system controller 10 having a preferred microprocessor-based control means 40. Control means 40 may also perform the function of detecting an occluded conduit and causing the display 15 to indicate a high pressure alert condition. For example, if a chamber inflating operation causes an excessive pressure (e.g., 100 mmHg) to be measured, control means 40 can automatically cause shutdown and alert the user.

Referring now to FIG. 4, a compression system according to one embodiment of the present invention will be described. According to this embodiment, the compression system comprises a system controller 10. The controller 10 has means for controlling transfers of air from a source of pressurized air 20 (e.g., a compressor) to inflatable chambers of first and second limb sleeves 22, 24, respectively. As illustrated, each limb sleeve (or combinations of single- and dual-chamber sleeves) comprises a plurality of inflatable chambers 22*a–d* and 24*a–d*. For purposes of illustration only, dotted-lines have been used to show pneumatic connections and solid-lines have been used to show electrical connections.

The system controller 10 further comprises first and second pluralities of feeder valves 26, 28 for enabling and disabling transfers of air from the pressurized air source 20 to the inflatable chambers 22*a–d* and 24*a–d*. In particular, each of the first plurality of feeder valves 26*a–d* is connected to respective ones of the chambers 22*a–d* and each of the second plurality of feeder valves 28*a–d* is connected to respective ones of the chambers 24*a–d*. The feeder valves 26*a–d* and 28*a–d* are preferably Model 35 Series valves, which are publicly available from MAC Valves Inc. of Wixom, Michigan.

Independent inflation control means 40 is also provided for opening the feeder valves 26*a–d*, 28*a–d* one-at-a-time during a respective first or second inflation cycle. Control means 40 is preferably microprocessor-based. For example, an application specific integrated circuit (ASIC) or a multi-purpose microprocessor 42 may be provided to perform command and control operations, based on instructions contained in memory 44, such as programmable read-only memory (PROM). A multi-purpose microprocessor, such as a Motorola Semiconductor Corp., Model MC68HC11A1 microprocessor may be used. Control means 40 also preferably performs the function of regulating pressures in each of the inflatable chambers 22*a–d* and 24*a–d*.

Accordingly, regulation means is provided by the controller 10 for measuring the pressures in each of the chambers and for adjusting the pressures by intermittently inflating (and deflating) respective chambers to maintain pressure levels in the chambers at predetermined values, as illustrated by FIG. 3A. Means for performing chamber pressure measurements preferably comprises a pressure transducer 46. According to a preferred aspect of the present invention, only one pressure transducer for the entire system, as opposed to one transducer for each sleeve chamber, is required to independently measure the pressures in each of the chambers, without depressurizing any of the other chambers. The pressure transducer is preferably a Model MPX5050GP transducer, which is publicly available from Motorola Semiconductor Corp. of Phoenix, Ariz.

The system controller also preferably comprises intermediate valve means, shown as three-way intermediate valves 25 and 27. The intermediate valves are preferably Model 170 Series valves, which are also publicly available from MAC Valves Inc. In response to control signals provided by control means 40, the intermediate valves perform the function of enabling and disabling transfers of air from the source 20 to respective first and second pluralities of feeder valves 26 and 28 during the first and second inflation cycles. A pressure relief valve 34 is also provided in case pressures within the controller 10 exceed a safe level.

As stated previously, the controller of the present invention is configurable to operate in several modes of operation. For instance, the controller may be configured to treat deep vein thrombosis, as discussed in detail herein. Further, the controller may be configured to treat other ailments that respond positively to pneumatic compression, such as circulatory disorders, lymphatic disorders, organ failure, joint problems, soft tissue trauma, wound healing through management of localized congestion, counteracting shock by minimizing pooling of blood, physical massage, pneumatic tourniquets, etc. The modes of operation used for these treatments are based on several different factors. For instance, these different treatment plans may require a certain pattern for inflating the compression sleeves by the controller.

As an example, in some treatment therapies it is advantageous to only treat one limb of the patient (i.e., one leg). In this embodiment, only one compression sleeve will be connected to the compression system. This compression sleeve will be placed on the limb to be treated. With reference to FIG. 4, because only one compression sleeve is connected to the compression system, the controller 40 of this embodiment will control the feeder valves such that pressurized air is provided only to the connector connected to the compression sleeve and not to the other connector.

In another embodiment, however, it may be advantageous to only treat a portion of a limb, such as treating only the calf section of a leg or only the forearm section of an arm. In this embodiment, only certain ones of the feeder valves 26*a–d* and 28*a–d* will be connected to the compression sleeve. Thus, the controller 40 is configured to only supply pressurized air through the feeder valves that are connected to the compression sleeve such that the inflation chambers that are mounted on the calf or forearm section of the limb are provided with pressurized air.

The controller of the present invention, also includes other modes of operation. As stated previously, the compression system of the present invention utilizes different types of compression sleeves that are configured to mount and conform to different body portions (i.e., calf, thigh, calf and thigh, foot, arm, forearm, torso, ect.). These differing compression sleeves require different compression cycles for proper treatment of the body portion to which they are mounted. Further, the compression system of the present invention also uses many different treatment methods for the same body portion based on the particular medical problems of the patient (i.e., deep vein thrombosis, circulatory disorders, lymphatic disorders, organ failure, joint problems, soft tissue trauma, wound healing through management of localized congestion, counteracting shock by minimizing pooling of blood, physical massage, pneumatic tourniquet ect). These differing treatment methods usually require different compression cycle patterns for inflating the compression sleeves. These differing compression cycles and the different treatment methods constitute different modes of operation for the controller.

In addition, at least one mode of operation includes an operation to verify and calibrate the system. In this mode of operation, a special compression sleeve or a calibration tube and connector, not shown, having only a single inflatable chamber or tube connected thereto is used to verify/calibrate the pressure transducer 46. In this particular mode of operation, the appropriate feeder valves are opened by the controller to allow the pressure transducer 46 to be calibrated against a known pressure in the connected compression sleeve. The pressure of the transducer is displayed on the LCD display 15 and can be adjusted by the user to match the pressure in the sleeve or can be recalibrated by software in the microprocessor.

The different modes of operation of the present invention are typically stored in the controller memory 44 and are accessed by the microprocessor 42 to control the action of the feeder valves 26*a–d* and 28*a–d*. The modes of operation are defined by varying the number of chambers used, varying the amount of pressure in the sleeves, varying the pressurization times, and varying the sequence in which the compression sleeves are inflated. These modes of operation used by the microprocessor 42 may be either selected manually from the memory by the user through the display 15 or automatically by the use of a sensor 36.

Figure 8:
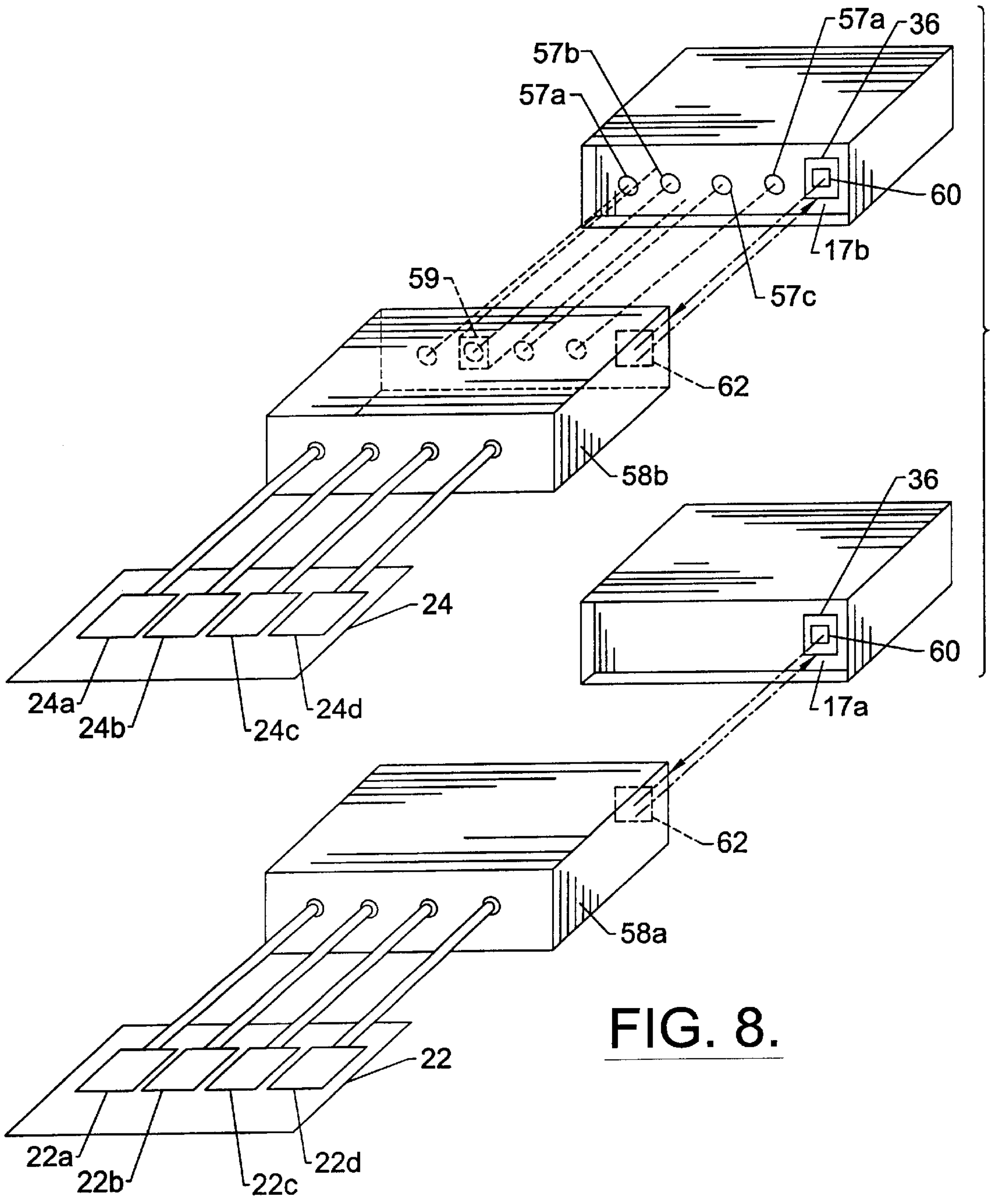
FIG. 8 is a perspective view of a universal connecting device according to one embodiment of the invention, wherein the device includes an optical signal generator.

In the automatic or non-user input mode, a sensor 36 is used to select the proper mode of operation. For instance, in one embodiment, the sensor 36 is used to determine whether a compression sleeve 22 or 24 is connected to the controller 10. The sensor 36 may also be used to determine whether more than one compression sleeve 22 or 24 is connected to the controller 40 for instances where two body portions (e.g., both legs) are to be treated. An example of these embodiments is shown in FIG. 8, which illustrates a connecting devices 17*a–b* and connectors 58*a–b*. This system includes optical signal generators 60 that direct an optical signal to the indicators 62 of the connectors to the compression sleeves 22 and 24. If the compression sleeves are connected to the connecting devices, the indicators 62 will reflect the optical signals and these reflected optical signals will be sensed by sensors 36. As shown in FIG. 4, the controller 40 receives the sensed signals from the sensors 36 and provides pressurized air to both of the compression sleeves 22 and 24 through the connecting devices 17*a* and 17*b*. However, if for example compression sleeve 24 is not connected to the connecting device 17*b*, the sensor will send a signal to the microprocessor that designates that the sleeve 24 is not connected to the connecting device 17*b*. The microprocessor will then configure the controller to prevent the flow of pressurized air to that connecting device 17*b*.

It is also advantageous in some embodiments to reconfigure the mode of operation for differing compression sleeves. As stated previously, the compression sleeves may differ in many ways based on the part of the body they are configured to conform to or the particular treatment to be performed on the body portion. For instance, in some embodiments the compression sleeves 22 and 24 may differ in the number of inflation chambers 22*a–d* and 24*a–d*. In this embodiment, the indicator 62 connected to the selected compression sleeve indicates either the number of inflation chambers or the pressure cycle to be used for the desired treatment. This indication is sensed by the sensor 36 and provided to the controller 40. The controller 40 then automatically adjusts to one, two, three, four, ect. inflation chambers or adjusts the cycle of pressure to the inflation chambers. Thus, the system can be configured automatically to perform several modes of operation without user input.

The mode of configuration may also be indicated by configuring the output ports of the feeder valves. For example, a blocking device may be used to restrict the air flow from one or more of the output valves, where the blocked output ports designate a particular mode of operation (blocking two of the output ports to designate that only two chambers are to be inflated). The mode of operation is determined by the controller by initially assessing the pressure associated with each output port to determine whether the port is blocked. Based on this assessment of the output ports the controller determines the proper mode of operation.

Figure 5:
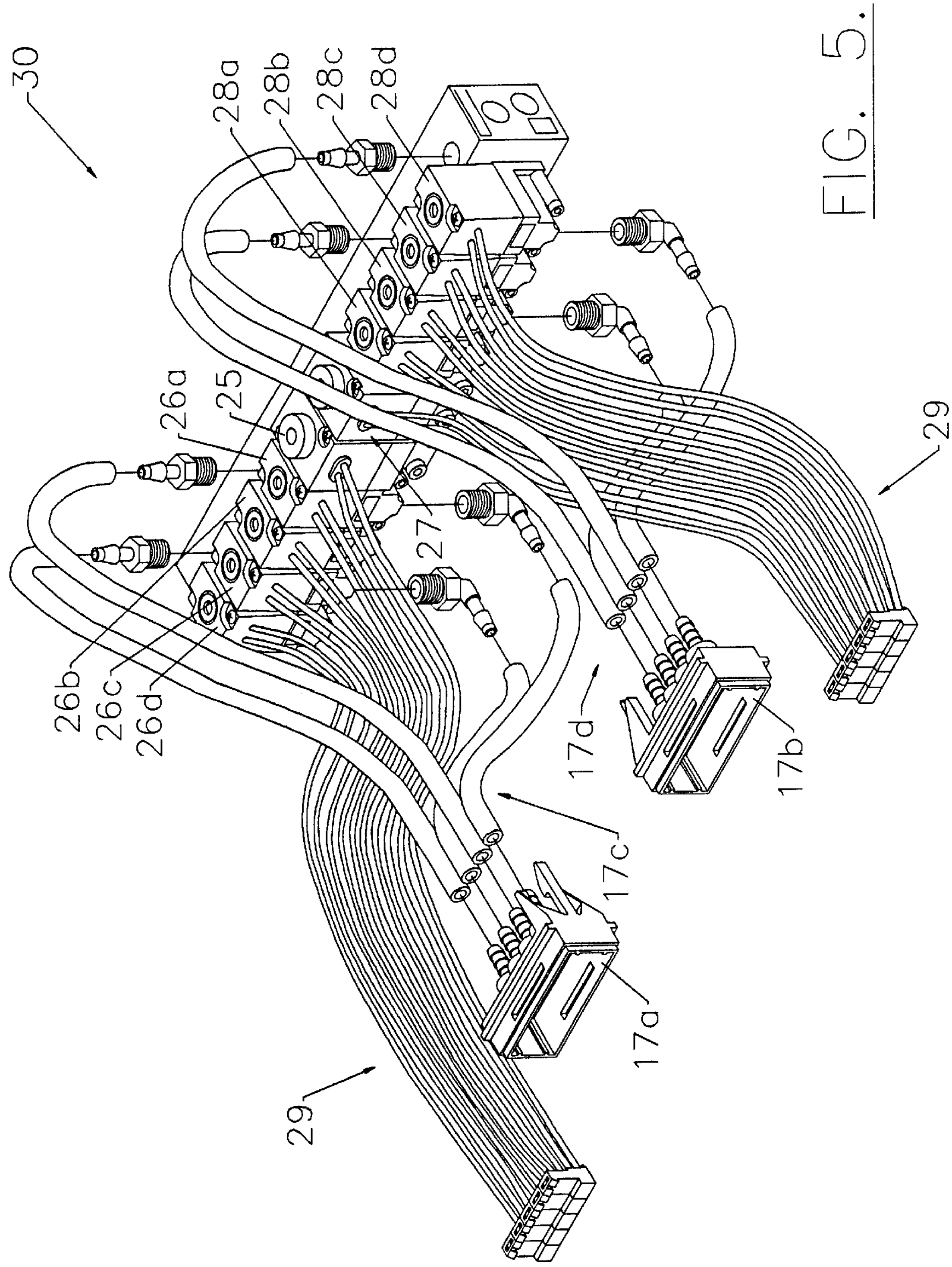
FIG. 5 is a perspective view of a valve manifold and associated hardware connected thereto.

In particular, with reference to FIG. 8 the output ports 17*a–b* of FIG. 5 are illustrated in greater detail. In this embodiment, these output ports are configured to mate to a plurality of connectors 58*a–b* that are associated with compression sleeves designated to operate with different modes of operation. These output ports contain output connectors 57*a–d* that are connected to the feeder valves and are configured to mate to the connectors 58*a–b*. In this embodiment, a blocking device 59 may be used to select the mode of operation of the controller. In particular, a blocking device 59 may placed in front of one of the output ports (e.g., 57*b*). As such, the blocking device 59 restricts the flow of air through the port 57*b*. The blocking device 59 may be of any material sufficient to restrict the flow of air in the output port. For example, the blocking device could be a plug disposed in the connectors 58*a–b* and cover the output ports when the output connectors 17*a–b* are connected to the connectors. Further, the blocking device may be just a flat surface disposed in the connectors 58*a–b* or even an adhesive tape covering the output port.

To ascertain the mode of the system, the controller initially determines the pressure on each port 57*a–d*. In particular, when the system is activated, the controller initially applies air flow through each of the feeder valves 26*a–d* to the output ports 57*a–d*. The blocking device 59 will restrict the flow of air through the output port 57*b*. The controller monitors the pressure associated with each output port 57*a–d* through the transducer. The transducer will sense a minimal pressure on the output ports 57*a*, 57*c*, 57*d* because they are not blocked by the blocking device 59. However, the transducer will sense a relatively high pressure on the output port 57*b* blocked by the blocking device 59 because the blocking device 59 has restricted the flow of air through the output port. Essentially, the blocked output port represents a logic one because of the high pressure and the open output ports represent a logic 0 because of the minimal pressure.

Based on the information from sensing the pressure of each output port, the control device will access memory and determine the mode of operation associated with the configuration of the blocked output port 57*b*. The controller then configures the system to operate in the selected mode.

As discussed above, the mode of operation may also be designated in this embodiment by blocking two or more of the output ports 57*a–d* or by blocking a selected combination of the output ports 57*a–d.*

Figure 9:
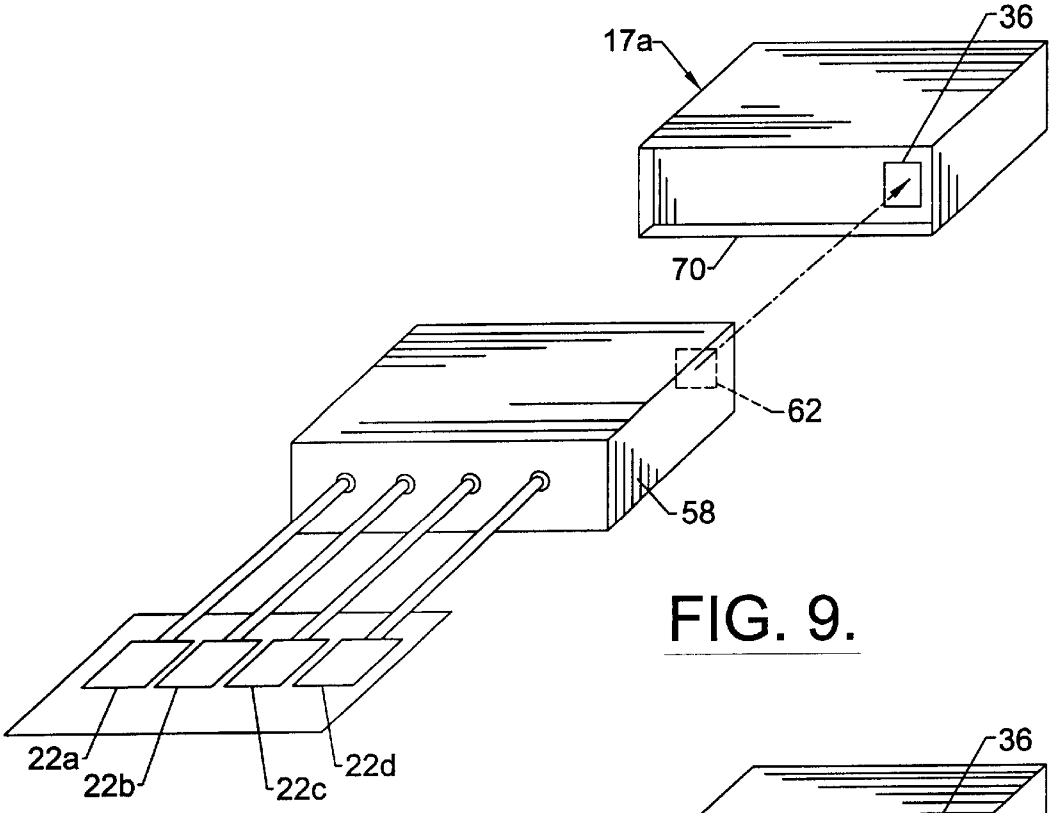
FIG. 9 is a perspective view of a universal connecting device according to another embodiment of the invention.

In some embodiments of the present invention, the configuration of the system into the selected mode of operation is performed by use of a universal connecting device. FIG. 9 illustrates one of the output ports 17*a* of FIG. 5 in greater detail. In this embodiment, these output ports are universal connecting devices configured to mate to a plurality of connectors that are associated with compression sleeves that are designated to operate with different modes of operation. In more detail, the universal connecting device contains a connector housing 70 for mating with a connector 58. A sensor 36 is operably mounted to the connector housing 70 and an indicator 62 is connected to the connector. The indicator 62 designates the selected mode of operation associated with the connector.

Figure 10:
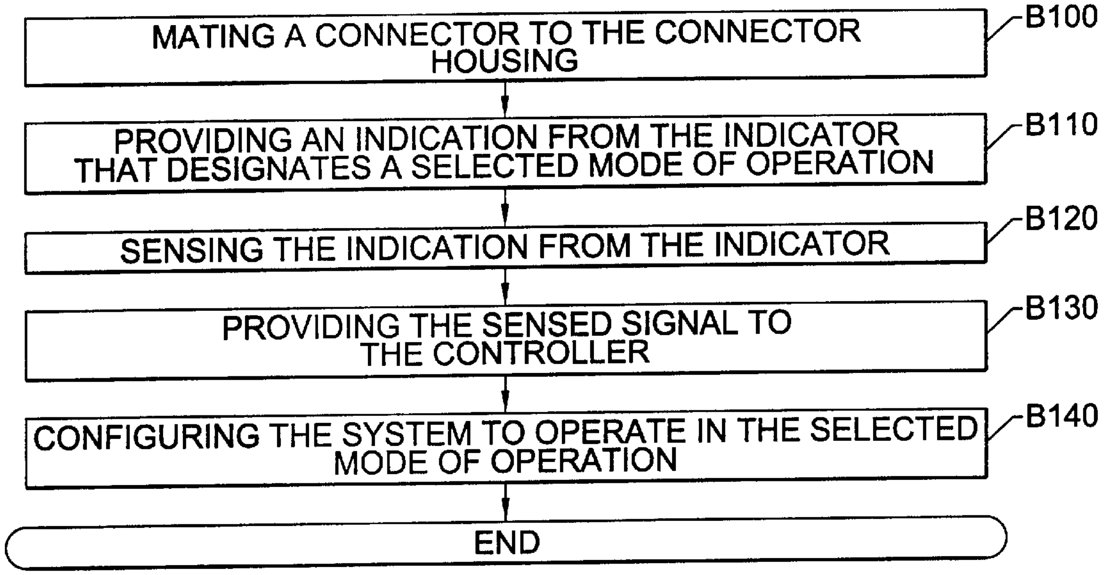
FIG. 10 is a flow chart illustrating the operations performed by the universal connecting device according to an embodiment of the present invention.

FIG. 10 illustrates the operation of the universal connecting device. With reference to FIGS. 9 and 10, in Block 100, a connector 58 is mated to the connector housing 70. An indication is then provided from the indicator connected to the connector, which designates a selected mode of operation associated with the connector. (Block 110). This indication is sensed by the sensor 36. (Block 120). The sensor 36 provides the sensed signal to the microprocessor 42 of the controller 40. (Block 130). Finally, the controller configures the system to operate in the predetermined mode of operation designated by the indicator based upon the definition of the respective mode provided by the indicator. (Block 140).

Although the universal connecting device is illustrated herein in connection with a device for improving venous blood flow, this is for illustrative purposes only. It is contemplated that the universal connecting device can be used for any type of system. Therefore, the universal connecting device should not be limited to the embodiments shown.

As shown above, the universal connecting device of the present invention can be used to determine the selected mode of operation associated with a connecter connected thereto. The universal connecting device can have many different embodiments, three of which are shown below as examples.

In one embodiment of the universal connecting device, the sensor 36 comprises a Hall Effect sensor for sensing an indication from the indicator. As commonly known, a Hall Effect sensor detects the presence of magnetic signals and provides a signal based on these sensed magnetic signals. For example, the north and south poles of a magnet generate differing magnetic fields. A Hall Effect sensor provides different voltage signals based on whether it senses a positive magnetic signal (i.e., north pole of a magnet) or a negative magnetic signal (i.e., south pole of a magnet) or when no magnetic signal is present (i.e., no magnet at all). This aspect of the Hall Effect sensor can be utilized to detect different modes of operation associated with connectors connected to the universal connecting device. Hall Effect sensors are publicly available from Micro Switch, a division of Honeywell, Inc.

Figure 11A:
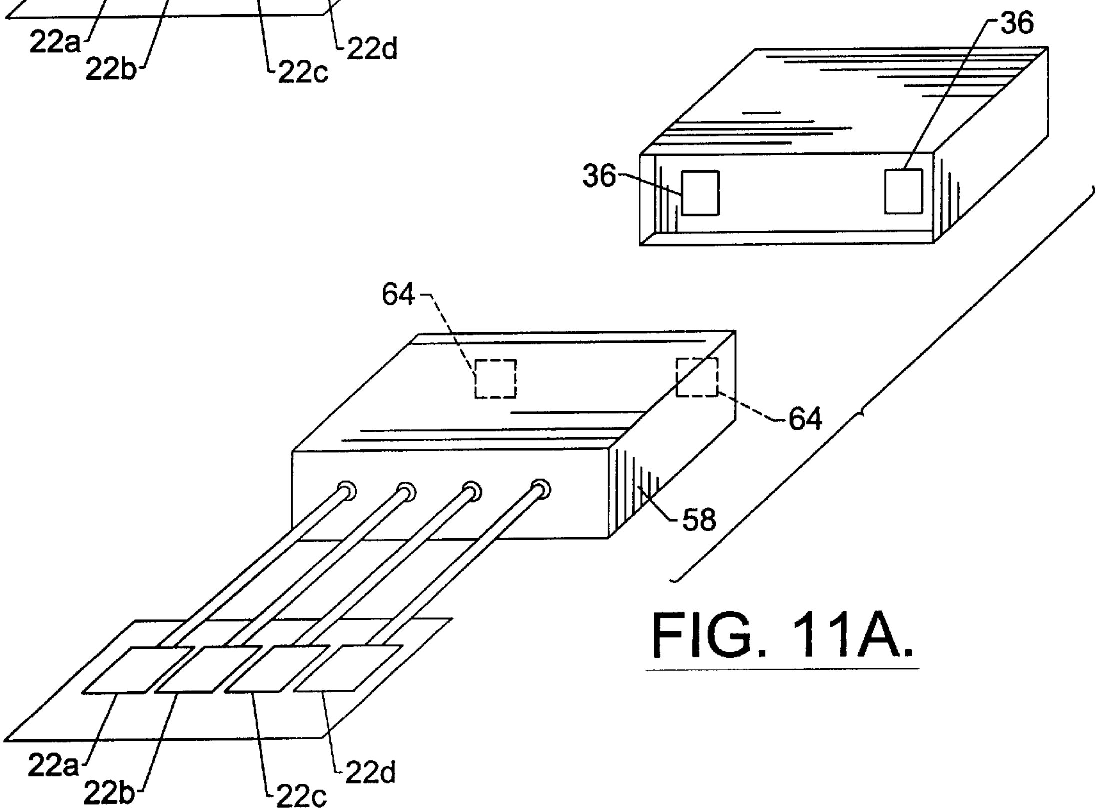
FIG. 11A is perspective view of a universal connecting device including a Hall Effect sensor according to another embodiment of the invention.
Figure 11B:
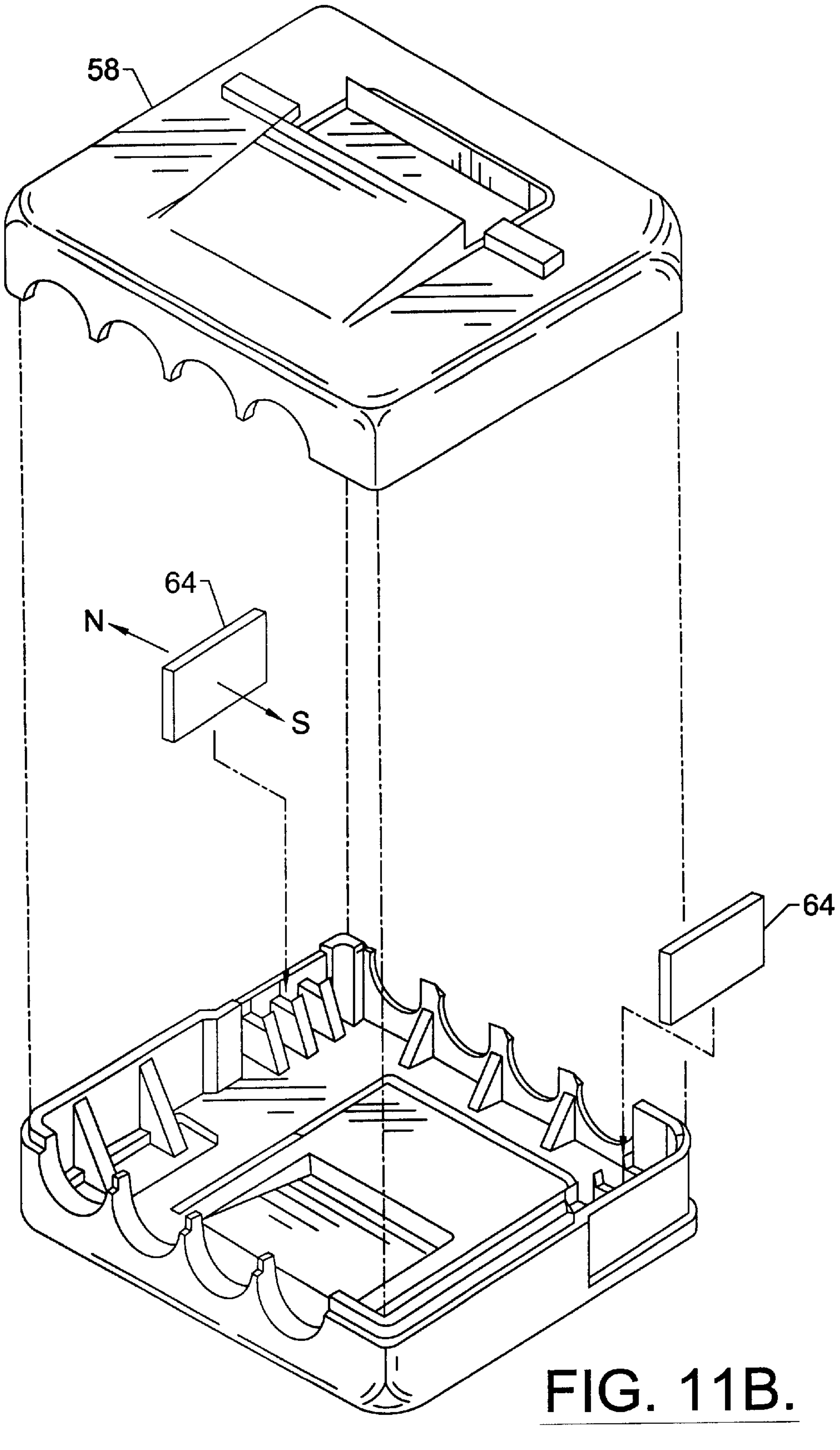
FIG. 11B is an exploded perspective view of a connector for connecting to the universal connecting device according to another embodiment of the invention.

FIG. 11A illustrates an embodiment of the present invention including a Hall Effect sensor. In this embodiment, the indicator 62 is located in the connector 58 and comprises a plurality of magnets 64. As shown in FIG. 11B, these magnets are either configured in a particular arrangement or are placed in a designated position, wherein the arrangement or the position corresponds to a predetermined mode of operation associated with the connector. In other words, either the placement or the configuration (i.e., respective polarity) of the magnets in the connector or a combination of both placement and configuration corresponds to a particular mode of operation for the system. Further, the absence of a magnet may also correspond to a particular mode. The placement and configuration of the magnets also correspond to a particular data point stored in the memory 42 of the controller, shown in FIG. 4.

In operation, the Hall Effect sensor 36 senses the placement or configuration of the magnets and provides a signal to the controller 40 that represents the mode of operation associated with the connector. The microprocessor 42 compares this sensed signal with the data stored in memory 44 and selects the data point that corresponds to the sensed signal. This data point is then used by the microprocessor 42 to configure the controller 40 for operating in the selected mode of operation. Thus, the controller 40 will properly control the action of the feeder valves 26*a–d* and 28*a–d* to provide pressurized air to the inflatable chambers of the compression sleeve and will also control the feeder valves to provide the correct cycle of pressurized air to the inflatable chambers depending on the designated treatment.

As stated above, the Hall Effect sensor 36 senses the configuration and placement of the magnets in the connector. For instance, in one embodiment a single magnet may be placed at different locations in the connector wherein each location signifies different modes of operation. In this embodiment, a Hall Effect sensor is placed at each possible location that the magnet may be placed. The Hall Effect sensor that corresponds to the placement of the magnet will provide a signal to the microprocessor. The microprocessor then compares the sensed signal to the data stored in memory 44 and configures the system to operate in the selected mode of operation.

FIG. 11B illustrates another embodiment of the universal connector with a Hall Effect sensor. In this embodiment, a plurality of magnets 64 are configured such that their configuration designates a mode of operation associated with the connector 58. The configuration of the magnets relates not only to their position in the connector 58 but also to their presence (i.e., is there a magnetic signal present) and polarity (i.e., north or south pole). For instance, as illustrated in FIG. 11B, the magnets 64 are arranged by polarity in the connector. The polarity of these magnets 64 are sensed by the Hall Effect sensors 36, and these sensed signals are provided to the microprocessor 44 of the controller 40 which compares the sensed signals to the data in memory 42. Table 1, shown below, illustrates the different combinations of two magnets used as indicators in a connector.

TABLE 1

| | Configuration | |
|---|---|---|
| Mode of Operation | Magnet 1 | Magnet 2 |
| 1 | No Magnet | No Magnet |
| 2 | No Magnet | North |
| 3 | No Magnet | South |
| 4 | North | No Magnet |
| 5 | South | No Magnet |
| 6 | North | North |
| 7 | North | South |
| 8 | South | North |
| 9 | South | South |

As seen from Table 1, two magnets can used to designate nine different modes of operation based on the presence and or configuration of the poles of the magnets. These modes of operation can be stored in memory and retrieved based on the configuration of the magnets As stated previously, some embodiments of the universal connecting device utilize an optical signal sensor to detect the mode of operation associated with a connector mated to the connecting device. With reference to FIG. 9 two of these embodiments are illustrated. In the first embodiment, the universal connecting device of the present invention further comprises an optical signal generator 60 and the indicator 62 connected to the connector 58 includes either a reflective or nonreflective material. The optical signal generator 60 directs an optical signal toward the indicator 62 of the connector 58 and the indicator 62 will reflect the signal if a reflective material is used or will not reflect the signal if a nonreflective material is used. Whether the indicator 62 reflects or does not reflect the optical signal indicates different modes of operation for the system. In this embodiment, the sensor 36 comprises an optical sensor that senses the optical signal reflected by the indicator 62 and provides a signal to the microprocessor 42 of the controller 40 designating whether a reflected signal was detected or not. Based on whether a signal was detected or not the microprocessor 42 determines the mode of operation associated with the connector 58 and configures the system.

As discussed in relation to the Hall Effect sensor, the indicator 62 of this embodiment may comprise a plurality of reflective and nonreflective strips that can be configured to provide different combinations for designating particular modes of operation much like the magnets shown in Table 1.

In another embodiment of the present invention, the indicator 62 comprises a material having a specified level of reflectivity that corresponds to an associated mode of operation. For instance, in this embodiment, the optical signal generator 60 directs an optical signal to the indicator 62 attached to the connector. The indicator 62 partially reflects the optical signal with a level of reflectivity that is associated with the selected mode of operation of the connector. This partially reflected signal is detected by the sensor 36, and the sensor provides the detected signal to the microprocessor of the controller 60. Here again, the microprocessor 42 compares the detected signal to data in the memory 44 and based on this comparison configures the controller 40 to operate in the mode of operation designated by the indicator 62.

Alternatively, instead of using the sensor 36 to determine the mode of operation, the system controller 10 may include means, responsive to actuation from the display 15, for manually configuring the controller 10 in the proper mode of operation. For example, a controller 10 having a 2-sleeve/4-chamber default configuration, as illustrated and described herein, can be readily converted to a 3-chamber or 2-chamber system by selecting the desired mode at the display 15. In addition, the controller 10 may also include means, preferably responsive to actuation from the display, for configuring the controller 10 in a customized mode of operation which allows sleeves of different length to be used. Thus, a first sleeve having four chambers may used on one limb and a second sleeve having two or three chambers may be used on another limb. Further, the display may be used to select differing modes of operation for specific treatments. As will be understood by those skilled in the art, these customized modes of operation may be controlled by the microprocessor 42. Selecting means, such as a membrane switch 16, may be provided at the display 15 for selecting these modes of operation.

Referring again to FIGS. 3A and 4, the operations performed by the system controller 10 of FIG. 4 during the first and second inflation cycles will be described. It should be noted that this description of operations is provided as an illustrative example and should not otherwise be construed as limiting the scope of the invention. The operations begin with the steps of connecting each of the chambers of the first and second limb sleeves 22 and 24 to respective conduits of first and second conduit ribbons 56, and then inserting respective male connecting members 52, at the source ends of the conduits, into each of the output ports 17*a* and 17*b*. Thereafter the controller is turned on by accessing the on/off switch 12. This causes the controller 10 and particularly control means 40 to perform various diagnostic start-up operations, such as performing a check, which is responsive to sensing means 36, to determine whether one or more of the sleeves is disconnected.

Control means 40 controls operations for inflating the first chamber 22*a* to 50 mmHg by providing a first control signal (e.g., logic 0) to feeder valves 2*a* and 28*a–d* and to the second intermediate valve 27. Second control signals (e.g., logic 1) are also provided to feeder valves 26*b–d,* along the solid control lines, as shown. Second control signals are also provided to the first intermediate valve 25 and to a source valve 32, which is connected to the source of pressurized air 20. These valves are preferably three-way, normally-open, solenoid controlled valves, as illustrated. Accordingly, the application of a second or "energizing" control signal to the solenoid of each valve causes the output of the valve to be directionally coupled to a first input, shown as opposite the input side of the valve. However, the application of a first or "deenergizing" signal to the solenoid of each valve causes the output to be directionally coupled to a second input (or vent), shown as orthogonal to the output side of the valve.

These initial operations will cause the source of pressurized air 20 to be pneumatically connected to the first chamber 22*a* and inflation will begin. Chambers 22*b–d* and chambers 24*a–d* are disconnected from the source and are not inflated at this time. In particular, feeder valves 26*b–d* will be held in an energized but blocking state, as shown by the pneumatic termination (- - - -|), and feeder valves 28*a–d* and the second intermediate valve 27 will be held in a deenergized and open state. As shown, the feeder valves 26*a–d* and 28*a–d* have been modified so that the first input is plugged. In addition, an energizing signal is also generated to open the source valve 32 and the first intermediate valve 25. A deenergizing signal is also generated to open the feeder valve 2*a,* which is now in a normally-open position and can accept pressurized air from the source 20.

Because the volume of the first chamber 22*a* will typically vary depending on the size of the sleeve and limb (and also whether the sleeve is loosely or tightly wrapped around the limb) control means 40 also performs special startup control operations, which typically occur during the first 5–10 inflation cycles for a respective sleeve. Here, during the initial inflation cycle for each sleeve, the controller inflates each chamber for a respective predetermined default time interval (retained in PROM 44) and then takes a measurement to determine whether the default time interval was long enough (or too long) to achieve the desired pressure level. If the measurement is too low, control means 40 will automatically increase the time interval so that during the next inflation cycle, the updated inflation time interval will be longer to correspond to the actual time needed for this chamber to inflate properly. These operations, which provide real-time feedback, typically occur repeatedly for each chamber during the first 5–10 inflation cycles or until the system "levels-out" at the desired inflation times. Because the respective inflation times are stored in volatile memory 48, such as RAM, these operations will need to be repeated every time the system is turned-on or reset. The PROM 44 may also contain a maximum fill time interval, so that if a chamber is not properly inflated in that interval, control means 40 will generate a fail-to-fill alert. This condition typically occurs when one of the conduits is disconnected from a chamber.

These special control operations will also need to be performed if the user-selected pressure levels, described above with reference to FIG. 2, are greater than or less than the default pressure levels of 50, 45, 40 and 30 mmHg. Moreover, if during the course of operation, the user or health care professional actuates the display 15 and adjusts the default pressure levels to new values, these special start-up control operations will be automatically performed again to generate new inflation times and adjust the system to the new pressure levels.

If the default time intervals for inflating each of the respective chambers is assumed accurate for purposes of illustration, then chamber 22*a* will inflate to the first predetermined pressure at time A, as shown. At time A, the deenergizing signal is applied to the source valve 32 to cause it to switch to its normally open position. When this occurs, the source will vent air through the controller housing to the surrounding atmosphere. The application of the deenergizing signal to the source valve also closes off the system so that the pressure transducer can accurately sample the pressure in the first chamber 22*a*.

Control means 40 also regulates the pressure in the first chamber 22*a* by adjusting it to the first predetermined pressure if the sample is outside an acceptable pressure tolerance. For example, a short inflating or deflating step can be performed to adjust the pressure in the first chamber 22*a*. In order to deflate the first chamber 22*a,* the second or energizing control signal can be temporarily removed from the first intermediate valve 25 in order to vent some of the air from the chamber through the feeder valve 26A and first intermediate valve 25. Alternatively, the energizing signal can also be temporarily reapplied to the source valve to obtain another "burst" of air into the first chamber 22A. To hold the first chamber 22*a* at 50 mmHg, an energizing signal is applied to feeder valve 2*a* to cause it to enter a blocking state, as shown by the pneumatic termination (- - - -|).

After the predetermined time interval of 2.5 second has elapsed from time A, control means 40 begins operations at time B for inflating the second chamber 22*b* by applying an energizing signal to the source valve 32 and first intermediate valve 25 and applying a deenergizing signal to feeder valve 26*b,* while holding feeder valves 2*a* and 26*c–d* in an energized (i.e., blocking) state.

At time C, the second chamber 22*b* will be inflated to 45 mmHg and then control means 40 will deenergize the source valve 32 and energize feeder valve 26*b* to thereby cause the source to vent to atmosphere while feeder valve 26*b* blocks the escape of air from the second chamber 22*b*. Measurement of the pressures in the first and second chamber can then be independently performed by first applying a temporary deenergizing signal to feeder valve 2*a* to open it and then taking a pressure sample, followed by adjustment, if necessary. Next, a temporary deenergizing signal is applied to feeder valve 26*b,* so that the pressure transducer 46 can sample the pressure in the second chamber 22*b* as well. Then while feeder valve 26*b* is still open, control means 40 can again perform the necessary operations to separately adjust the pressures in the second chamber 22*b*. The above-described operations are again repeated at times D–G, so that at time H, control means 40 can provide a deenergizing signal to the first intermediate valve 25 and to each of the feeder valves 26*a–d* so that all chambers vent through the first intermediate valve 25.

Analogous operations are also performed by control means 40 to inflate and regulate the second sleeve 24. In particular, deenergizing signals are maintained at each of the feeder valves 26*a–d* and first intermediate valve 25 so that the first sleeve 22 remains in a deflated state. To begin inflation of the first chamber 24*a,* control means 40 provides energizing signals to open the source valve 32 and the second intermediate valve 27 and also provides energizing signals to feeder valves 28*b–d* to maintain them in the blocking state. Accordingly, a connection is provided between the source 20 and first chamber 24*a* at the beginning of the second inflation cycle.

As described above, means, such as a membrane switch at the display 15 or an RS232 data port, may also be provided to allow adjustment of the controller so that a 2, 3, . . . , N-chamber mode of operation may be readily achieved in either sleeve. For example, a controller 10 having a 2-sleeve/4-chamber default configuration as described herein, can be converted to a 3-chamber system by selecting this mode at the display 15. Based on this selection, control means 40 would disable normal operations for inflating fourth chambers 22*d,* 24*d* by continuously providing energizing signals to feeder valves 26*d* or 28*d* to maintain them in a blocking state. Similarly, four chamber operation in the first sleeve and two chamber operation in the second sleeve can be selected. In this mode, control means 40 would disable normal operations for inflating third and fourth chambers 24*c–d,* by continuously providing energizing signals to feeder valves 28*c–d* to continuously maintain them in a blocking state during the second inflation cycle.

Referring now to FIG. 5, the valve manifold 30 is illustrated in greater detail. In particular, the first and second output ports 17*a–b* and associated conduits 17*c–d* are provided for pneumatically connecting each of the outputs of the feeder valves 26*a–d* and 28*a–d* to respective ones of the conduits 54. In addition, energizing and deenergizing control signals from control means 40 to feeder valves 26*a–d* and 28*a–d* and first and second intermediate valves 25, 27 are provided by electrical connections 29, as shown.

Figure 7:
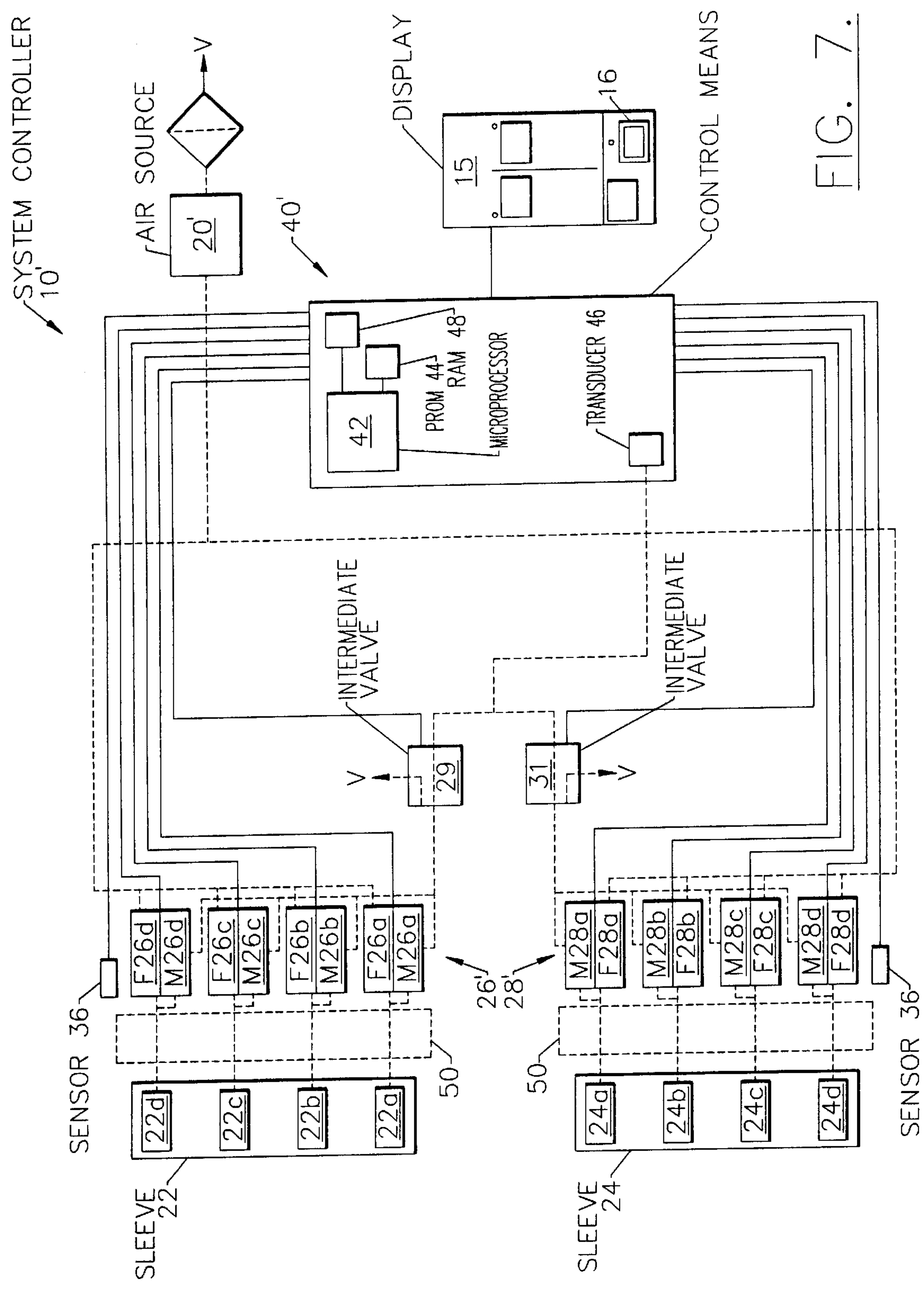
FIG. 7 is a schematic diagram illustrating a compression system according to a second embodiment of the present invention.

Referring now to FIG. 7, a compression system according to a second embodiment of the present invention will be described. This embodiment is functionally similar to the first embodiment, but has notable differences as described more fully hereinbelow. According to this embodiment, the compression system comprises a system controller 10' for controlling transfers of pressurized air from an internal or external source 20' to a plurality of inflatable chambers

22*a–d* and 24*a–d* during respective inflation cycles and for venting the source 20' at vent "V" during respective deflation cycles and typically also when the pressure in any chamber is being measured after the respective chamber has been inflated to a predetermined level. For purposes of illustration only, dotted-lines have been used to show pneumatic connections and solid-lines have been used to show electrical connections. The system controller 10' further comprises first and second pluralities of feeder valve means 26', 28' for enabling and disabling transfers of air from the pressurized air source 20' to the inflatable chambers 22*a–d* and 24*a–d*. Each of the four feeder valve means in the first and second pluralities 26' and 28' preferably comprises a pair of filling and monitoring valves: (F26*a,* M26*a*), (F26*b,* M26*b*), (F26*c,* M26*c*), (F26*d,* M26*d*) and (F28*a,* M28*a*), (F28*b,* M28*b*), (F28*c,* M28*c*), (F28*d,* M28*d*). The use of a pair of filling and monitoring valves provides a number of preferred advantages relative to the normally-open feeder valves 26*a–d* and 28*a–d* of FIG. 4, as described more fully hereinbelow.

The filling valves F26*a–d* and F28*a–d* are preferably normally closed valves and the monitoring valves M26*a–d* and M28*a–d* are preferably normally open valves. These valves, which may be combined as a valve manifold, are available from Matrix S.r.l, Ivrea, Italy. Here, the filling valves F26*a–d* and F28*a–d* have an open state for enabling one-at-a-time transfer of pressured air from the source 20' to the inflatable chambers 22*a–d* and 24*a–d* of the first and second limb sleeves 22 and 24, in response to application of an energizing signal (e.g., logic 1), and a normally-closed blocking state which disconnects a respective chamber from the air source 20'. In contrast, the monitoring valves M26*a–d* and M28*a–d* have a normally-open state for enabling transfer of pressurized air from a respective inflatable chamber (attached to an input thereof) to an output thereof. These outputs can be pneumatically coupled, through a corresponding three-way normally-open intermediate valve (29 or 31), to the vent "V" or a pressure transducer 46 in response to appropriate control signals. As illustrated, the intermediate valves 29 and 31 have two outputs. In the first normally-open state, the input to each intermediate valve 29 and 31 is pneumatically connected to a first output thereof (which is connected to the vent "V") and in the second open state the input to each intermediate valve is pneumatically connected to the pressure transducer 46. Each intermediate valve can be disposed in the second open state by applying an energizing signal thereto. The monitoring valves M26*a–d* and M28*a–d* also have a closed state (which can be achieved by application of an energizing signal (e.g., logic 1)) to prevent the escape of pressured air from a respective chamber when other chambers are being inflated or when the pressures in other chambers are being independently measured.

Control means 40', which is operatively connected to the filling, monitoring and intermediate valves, is also provided for inflating a first inflatable chamber 22*a* of the first limb sleeve 22 by disposing the corresponding filling valve (e.g., F26*a*) in an open state and the other filling valves F26*b–d* and F28*a–d* in their respective normally-closed states. During inflation of the first inflatable chamber 22*a,* the corresponding first monitoring valve (e.g., M26*a*) is also disposed in a normally-open state so that the pressure in the first inflatable chamber 22*a* can be monitored (i.e., measured or sampled) in real time as it is being inflated and thereafter when the first inflatable chamber 22*a* is fully inflated and the corresponding filling valve (e.g., F26*a*) has been closed. Monitoring of the pressure in the first inflatable chamber 22*a* is preferably achieved by also disposing the corresponding three-way intermediate valve (e.g., 29) in its second open state (in response to an energizing logic 1 signal) so that the pressure transducer 46 embodied in the control means 40' becomes pneumatically coupled to the first inflatable chamber 22*a* and performs a measurement of the pressure therein. Thus, in contrast to the first embodiment of FIG. 4, the pressure in a chamber can be continuously measured as the chamber is being inflated to its respective predetermined pressure. This provides real-time feedback of the chamber pressure. Preferably, this real-time feedback is used by the control means 40' to adjust the inflation time of the respective chamber during the current or subsequent inflation cycle(s). The amount of time needed to measure the pressure in a chamber after the respective filling valve closes can also be reduced since the pneumatic connecting lines between the respective monitoring valve and the pressure transducer 46 will already be at least partially pressurized at the respective chamber pressure.

As illustrated by Tables 2 and 3, the above described operations for inflating and measuring pressure in the first inflatable chamber 22*a* of the first limb sleeve 22 are repeatedly performed by the control means 40' during the inflation of the remaining chambers of the limb sleeves 22 and 24. In these tables, the label "C" indicates that the respective valve is in a "closed" state, the label "O" indicates that a respective valve is in an "open" state and the label "V" indicates that a respective valve is in a "venting" state.

TABLE 2

| | VALVE | | | | | | | | | | | |
|---|---|---|---|---|---|---|---|---|---|---|---|---|
| CHAMBER | F26a | M26a | F26b | M26b | F26c | M26c | F26d | M26d | 29 | 31 | F28 a–d | M28 a–d |
| FILL 22a | O | O | C | C | C | C | C | C | O | V | C | O |
| MONITOR 22a | C | O | C | C | C | C | C | C | O | V | C | O |
| FILL 22b | C | C | O | O | C | C | C | C | O | V | C | O |
| MONITOR 22b | C | C | C | O | C | C | C | C | O | V | C | O |
| FILL 22c | C | C | C | C | O | O | C | C | O | V | C | O |
| MONITOR 22c | C | C | C | C | C | O | C | C | O | V | C | O |
| FILL 22d | C | C | C | C | C | C | O | O | O | V | C | O |
| MONITOR 22d | C | C | C | C | C | C | C | O | O | V | C | O |

TABLE 3

| | VALVE | | | | | | | | | | | |
|---|---|---|---|---|---|---|---|---|---|---|---|---|
| CHAMBER | F28a | M28a | F28b | M28b | F28c | M28c | F28d | M28d | 29 | 31 | F26 a–d | M26 a–d |
| FILL 24a | O | O | C | C | C | C | C | C | V | O | C | O |
| MONITOR 24a | C | O | C | C | C | C | C | C | V | O | C | O |
| FILL 24b | C | C | O | O | C | C | C | C | V | O | C | O |
| MONITOR 24b | C | C | C | O | C | C | C | C | V | O | C | O |
| FILL 24c | C | C | C | C | O | O | C | C | V | O | C | O |
| MONITOR 24c | C | C | C | C | C | O | C | C | V | O | C | O |
| FILL 24d | C | C | C | C | C | C | O | O | V | O | C | O |
| MONITOR 24d | C | C | C | C | C | C | C | O | V | O | C | O |

The drawings and specification disclose typical preferred embodiments of the present invention and, although specific terms are employed, they are used in a generic and descriptive sense only and not for purposes of limitation, the scope of the invention being set forth in the following claims.

That which is claimed is:

1. A method for improving venous blood flow in a selected portion of the user's body by applying a series of compressive forces thereto, wherein said method comprises the steps of:

mounting at least one sleeve of a plurality of sleeves on a selected portion of the body, wherein the sleeve includes at least one inflatable chamber, wherein the sleeve is adapted to perform at least one mode of blood flow treatment to the selected portion of the body, and wherein each mode of blood flow treatment has different inflation cycles of pressurized air provided to the inflatable chambers of the sleeve;

providing an indication from said sleeve that designates a predetermined mode of operation corresponding to a mode of blood flow treatment associated with said sleeve; and controlling the flow of pressurized air to the chambers of the sleeve based on the mode of operation indicated from the indication in said providing step, such that the proper inflation cycles corresponding to the mode of blood flow treatment associated with the sleeve are provided to the selected portion of the body.

2. A method according to claim 1 wherein said method further comprises the step of sensing the indication provided by said providing step.

3. A method according to claim 2, wherein said providing step comprises the step of providing a magnetic signal designating a selected mode of operation, and wherein said sensing step comprises the step of sensing the magnetic signal.

4. A method according to claim 2, wherein said providing step comprises the step of providing a plurality of magnetic signals designating a selected mode of operation, and wherein said sensing step comprises the step of sensing the magnetic signal.

5. A method according to claim 1 wherein said method further comprises the step of directing a light signal on an indicator attached to said sleeve, such that said providing step comprises the step of partially reflecting said light, and wherein said amount of reflection indicates a predetermined mode of operation associated with said sleeve.

6. A method according to claim 2, wherein said method further comprises the step of generating a pressure for applying to said inflatable chamber, wherein said providing step comprises blocking the pressure, thereby indicating a first mode of operation, and wherein said sensing step comprises sensing the pressure blocked in said providing step to thereby determine the mode of operation indicated in said providing step.

7. A device for improving venous blood flow in selected portions of the user's body by applying a series of compressive forces thereto, wherein said device comprises:

a plurality of sleeves each having at least one inflatable chamber, wherein each sleeve of said plurality is configured to mount upon and conform to a selected portion of the user's body, wherein each of said sleeves is adapted to perform at least one mode of blood flow treatment of the selected portion of the body, and wherein each mode of treatment has different inflation cycles of pressurized air provided to the inflatable chambers of said sleeves;

an indicator operably connected to at least one of said sleeves for designating a predetermined mode of operation corresponding to a mode of blood flow treatment associated with said sleeve;

a pump for supplying pressurized air to the sleeves;

a feeder valve pneumatically connectable to said sleeve for enabling and disabling flow of pressurized air from the pump to said sleeve during an inflation cycle; and a controller, operatively connected to said feeder valve, wherein said controller defines a plurality of modes of operation having differing inflation cycles for controlling the flow of pressurized air to the respective sleeves, and wherein said controller selects the mode of operation based on the designation provided by said indicator, such that the controller controls the pump to provide the mode of operation associated with the corresponding mode of blood flow treatment of said sleeve.

8. A device according to claim 7 wherein said device further comprises a connector having opposing ends, wherein one end is operably connected to said sleeve and the opposed end is operably connected to said feeder valve, and wherein said indicator is disposed in the opposed end of said connector.

9. A device according to claim 8 wherein said device further comprises a connecting device comprising:

a connector housing having opposed ends, wherein one end is operably connected to said feeder valve and said opposed end is operably connected to said opposed end of said connector; and a sensor operably mounted to said connector housing in operable communication with said indicator such that said sensor senses an indication from said indicator and provides a signal indicative of the mode of operation corresponding to the mode of blood flow treatment associated with said sleeve.

10. A device according to claim 4 wherein said controller is in operable communication with said sensor and controls the mode of operation of said device based on the signal provided by said sensor.

11. A device according to claim 1, wherein said device further comprises a sensor in operable communication with said controller for sensing an indication from said indicator, wherein said sensor provides a signal indicative of the predetermined mode of operation associated with said sleeve connected to said feeder valve.

12. A device according to claim 4, wherein said sensor comprises a Hall Effect sensor and said indicator comprises at least one magnet for providing a magnetic signal that designates the predetermined mode of operation associated with said sleeve.

13. A device according to claim 10, wherein said device further comprises an optical signal generator for generating an optical signal, wherein said indicator defines a level of reflectivity that corresponds to a predetermined mode of operation associated with said sleeve, wherein said indicator partially reflects the optical signal generated by said optical signal generator to indicate the predetermined mode of operation associated with said sleeve, and wherein said sensor receives the partially reflected signal from said indicator.

14. A device according to claim 1 wherein said indicator designates the mode of operation associated with said sleeve based on the number of inflation chambers in said sleeve.

15. A device according to claim 7 wherein said indicator designates the mode of operation associated with said sleeve based on the selected portion of the body that the sleeve is mounted and conformed.

16. A device according to claim 1, wherein said indicator comprises a blocking device connected to said feeder valve for restricting the flow of pressurized air from the pump to the sleeve, thereby indicating a first mode of operation.

17. A device according to claim 16, wherein said controller determines the mode of operation by controlling the pump to provide pressurized air to said feeder valve and monitoring the pressure on said feeder valve to determine if said blocking device is connected to said feeder valve, and wherein said controller selects the mode of operation based on whether the blocking device is connected to the feeder valve.

* * * * *

UNITED STATES PATENT AND TRADEMARK OFFICE

CERTIFICATE OF CORRECTION

PATENT NO. : 6,786,879 B1
APPLICATION NO. : 09/103694
DATED : September 7, 2004
INVENTOR(S) : Bolam et al.

It is certified that error appears in the above-identified patent and that said Letters Patent is hereby corrected as shown below:

On the Title page of the Letters Patent, in the "Related U.S. Application Data" section (63), please replace "08/233,429" with --08/223,429-- and
please replace "5,454,700" with --5,575,762--

Signed and Sealed this

Fifth Day of August, 2008

Jon W. Dudas

JON W. DUDAS
*Director of the United States Patent and Trademark Office*